(12) United States Patent
Kim et al.

(10) Patent No.: US 9,391,461 B2
(45) Date of Patent: Jul. 12, 2016

(54) WIRELESS POWER TRANSMISSION AND CHARGING SYSTEM, AND POWER CONTROL METHOD OF WIRELESS POWER TRANSMISSION AND CHARGING SYSTEM

(75) Inventors: Nam Yun Kim, Seoul (KR); Sang Wook Kwon, Seongnam-si (KR); Yun Kwon Park, Dongducheon-si (KR); Eun Seok Park, Yongin-si (KR); Young Tack Hong, Seongnam-si (KR); Ki Young Kim, Yongin-si (KR); Young Ho Ryu, Yongin-si (KR); Dong Zo Kim, Yongin-si (KR); Jin Sung Choi, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 13/482,019

(22) Filed: May 29, 2012

(65) Prior Publication Data

US 2012/0306433 A1 Dec. 6, 2012

(30) Foreign Application Priority Data

May 31, 2011 (KR) .................. 10-2011-0051888

(51) Int. Cl.
*H02J 7/00* (2006.01)
*H02J 5/00* (2016.01)
(Continued)

(52) U.S. Cl.
CPC .............. *H02J 5/005* (2013.01); *B60L 11/182* (2013.01); *B60L 11/1833* (2013.01); *H02J 7/025* (2013.01); *H02J 17/00* (2013.01); *B60L 2210/10* (2013.01); *B60L 2210/30* (2013.01); *B60L 2210/40* (2013.01); *B60L 2250/16* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC ............ H03H 7/40; H02J 5/005; H02J 17/00; Y02B 60/50
USPC .......................................... 320/106, 108, 150
See application file for complete search history.

(56) References Cited

U.S. PATENT DOCUMENTS 6,882,130 B2 * 4/2005 Handa et al. ................. 320/135
8,044,813 B1 * 10/2011 Dembo et al. ................ 340/635
(Continued)

FOREIGN PATENT DOCUMENTS

| KR | 10-2009-0006263 | 1/2009 |
| KR | 10-2009-0056546 | 6/2009 |
| KR | 10-2011-0004326 | 1/2011 |

*Primary Examiner* — Helen Rossoshek
(74) *Attorney, Agent, or Firm* — NSIP Law

(57) ABSTRACT

A wireless power transmission and charging system, and a power control method of the wireless power transmission and charging system are provided. The power control method may include generating charging power using the power amplifier. The charging power may be used to charge a target device. The charging power may be transmitted to the target device. The voltage supplied to the power amplifier may be adjusted based on a detected change in the current input to the power amplifier, a detected change in the temperature of the source device, a detected change in the amount of the power received to the target device, or a detected change in the temperature of the target device.

20 Claims, 29 Drawing Sheets

(51) Int. Cl.
  *H02J 17/00* (2006.01)
  *H02J 7/02* (2016.01)
  *B60L 11/18* (2006.01)

(56) References Cited

U.S. PATENT DOCUMENTS

| | | | |
|---|---|---|---|
| 8,441,154 B2 * | 5/2013 | Karalis et al. | 307/104 |
| 8,466,583 B2 * | 6/2013 | Karalis et al. | 307/104 |
| 8,704,484 B2 * | 4/2014 | Rosik et al. | 320/108 |
| 8,798,562 B2 * | 8/2014 | Kopikare et al. | 455/127.1 |
| 8,803,474 B2 * | 8/2014 | Hillan et al. | 320/108 |
| 8,829,849 B2 * | 9/2014 | Kim et al. | 320/108 |
| 2009/0284220 A1 | 11/2009 | Toncich et al. | |
| 2010/0244576 A1 * | 9/2010 | Hillan et al. | 307/104 |
| 2010/0253281 A1 * | 10/2010 | Li | 320/108 |
| 2011/0018679 A1 * | 1/2011 | Davis et al. | 340/3.1 |
| 2011/0291613 A1 * | 12/2011 | Rosik et al. | 320/108 |
| 2012/0112691 A1 * | 5/2012 | Kurs et al. | 320/108 |
| 2012/0119698 A1 * | 5/2012 | Karalis et al. | 320/108 |
| 2012/0228952 A1 * | 9/2012 | Hall et al. | 307/104 |
| 2012/0235633 A1 * | 9/2012 | Kesler et al. | 320/108 |
| 2012/0235634 A1 * | 9/2012 | Hall et al. | 320/108 |
| 2012/0306284 A1 * | 12/2012 | Lee et al. | 307/104 |
| 2012/0309306 A1 * | 12/2012 | Kim et al. | 455/41.1 |
| 2012/0311363 A1 * | 12/2012 | Kim et al. | 713/323 |
| 2013/0026851 A1 * | 1/2013 | Taguchi | 307/104 |
| 2013/0033118 A1 * | 2/2013 | Karalis et al. | 307/104 |
| 2013/0058379 A1 * | 3/2013 | Kim et al. | 375/146 |
| 2013/0058380 A1 * | 3/2013 | Kim et al. | 375/146 |
| 2013/0127256 A1 * | 5/2013 | Kim et al. | 307/104 |
| 2013/0300206 A1 * | 11/2013 | Kim et al. | 307/104 |
| 2013/0300209 A1 * | 11/2013 | Long et al. | 307/104 |
| 2014/0015331 A1 * | 1/2014 | Kim et al. | 307/104 |
| 2014/0021796 A1 * | 1/2014 | Song et al. | 307/104 |
| 2014/0077614 A1 * | 3/2014 | Park et al. | 307/104 |
| 2014/0084858 A1 * | 3/2014 | Kim et al. | 320/108 |
| 2014/0111018 A1 * | 4/2014 | Kwon et al. | 307/104 |
| 2014/0111153 A1 * | 4/2014 | Kwon et al. | 320/108 |
| 2014/0113689 A1 * | 4/2014 | Lee | 455/573 |
| 2014/0152251 A1 * | 6/2014 | Kim et al. | 320/108 |
| 2014/0203657 A1 * | 7/2014 | Song et al. | 307/104 |
| 2014/0204860 A1 * | 7/2014 | Kim et al. | 370/329 |
| 2014/0312706 A1 * | 10/2014 | Fiorello et al. | 307/104 |

* cited by examiner

FIG. 4B

| REFERENCE POINT FIELD | CALL ARGUMENT FIELD | MOVEMENT ARGUMENT FIELD |
|---|---|---|
| 'M' or 1<br>'L' or 0 | 1~n | 0~n |

FIG. 15

| ID configuration | Areas | Description |
|---|---|---|
| A | Manufacturer ID | Information on manufacturer of product |
| B | Product type | Information on product type, maximum output, and size of resonator |
| C | Model type | Maximum number of targets |
| D | Serial No. | Unique serial number assigned in manufacturing of product |
| E | Short ID | Short ID created from unique serial number of product |
| F | Standard version ID | Information on standard of source |

FIG. 16

| ID configuration | Areas | Description |
|---|---|---|
| A | Manufacturer ID | Information on manufacturer of product |
| B | Product type | Information on product type, and charging scheme |
| C | Battery type | Information on battery type, voltage capacity, and current capacity |
| D | Serial No. | Unique serial number assigned in manufacturing of product |
| E | Short ID | Short ID created from unique serial number of product |
| F | Standard version ID | Information on standard of target |

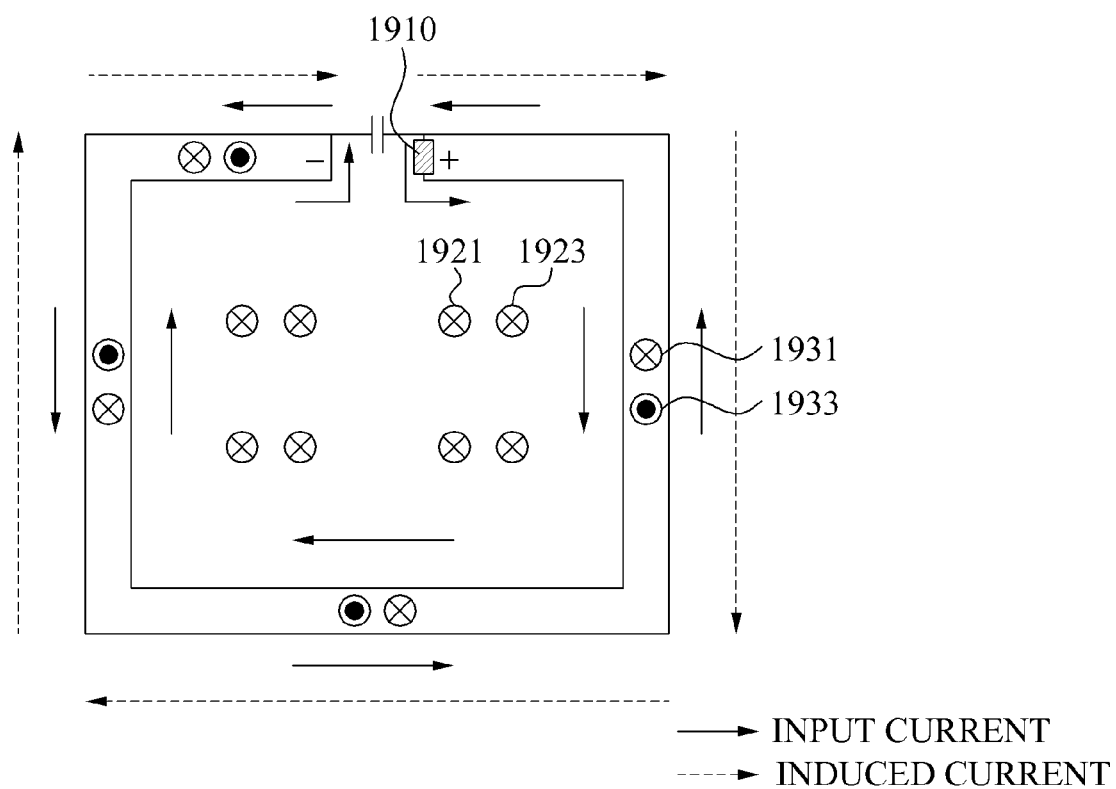

WIRELESS POWER TRANSMISSION AND CHARGING SYSTEM, AND POWER CONTROL METHOD OF WIRELESS POWER TRANSMISSION AND CHARGING SYSTEM

CROSS-REFERENCE TO RELATED APPLICATION(S)

This application claims the benefit under 35 U.S.C. §119 (a) of Korean Patent Application No. 10-2011-0051888, filed on May 31, 2011, in the Korean Intellectual Property Office, the entire disclosure of which is incorporated herein by reference for all purposes.

BACKGROUND

1. Field

The following description relates to wireless power transmission and charging.

2. Description of Related Art

Wireless power refers to energy that is transferred from a wireless power transmitter to a wireless power receiver, for example, through magnetic coupling. A typical wireless power transmission and charging system includes a source device and a target device. The source device may wirelessly transmit a power, and the target device may wirelessly receive a power. The source device includes a source resonator, and the target device includes a target resonator. Magnetic coupling or resonance coupling may be formed between the source resonator and the target resonator.

SUMMARY

According to an aspect, a power control method of a wireless power transmission and charging system may include: generating charging power using the power amplifier, the charging power being used to charge a target device; transmitting the charging power to the target device; detecting a change in a current input to the power amplifier, a change in a temperature of the source device, a change in an amount of a power received to the target device, or a change in a temperature of the target device; and adjusting a voltage supplied to the power amplifier, based on the detected change in the current input to the power amplifier, the detected change in the temperature of the source device, the detected change in the amount of the power received to the target device, or the detected change in the temperature of the target device.

The power control method may further include: assigning, by a source device, a control identifier (ID) to the at least one target device, the control ID being used to identify the target device.

The power control method may further include: determining an amount of a reference power, based on a battery state of the target device to which the control ID is assigned, the reference power being supplied to a power amplifier.

The adjusting may include: adjusting the voltage supplied to the power amplifier, so that the reference power is supplied to the power amplifier.

The adjusting may include: adjusting the voltage supplied to the power amplifier using a lookup table configured to store an amount of the voltage to be adjusted based on the change in the temperature of the source device.

The change in the temperature of the target device may be detected based on data received from the target device.

The change in the amount of the power received to the target device may be detected, based on data received from the target device, a pre-measured power transmission efficiency, and an output power amount of the power amplifier.

The assigning may include: transmitting an access standard instruction comprising an access standard required to identify a plurality of target devices; transmitting a call parameter to the plurality of target devices, to detect temporary IDs of the plurality of target devices, the temporary IDs being created based on the access standard; and assigning control IDs to the plurality of target devices, based on a plurality of response signals received from the plurality of target devices in response to the call parameter.

The access standard instruction may include: a reference point field, a call argument field, and a movement argument field, wherein the reference point field indicates a reference point that is used to create a temporary ID of a target device from a unique ID of the target device, and the call argument field indicates n consecutive bits starting from the reference point, and the movement argument field indicates a number of bits corresponding to a movement of the reference point.

The transmitting of the call parameter may include: transmitting the call parameter at predetermined intervals, the call parameter being generated based on a value set in the call argument field.

The assigning of the control IDs may include: assigning a control ID to a target device having a temporary ID identical to the call parameter, when the target device transmits an acknowledge (ACK) signal in response to the call parameter.

According to another aspect, a wireless power transmitter of a wireless power transmission and charging system may include: a power converter configured to generate power; a source resonator configured to transmit the power to a target device; and a control/communication unit configured to adjust a voltage supplied to a power amplifier based on a change in a current input to the power amplifier, wherein a change in a temperature of the source device, a change in an amount of a power received to the target device, or a change in a temperature of the target device.

The power converter may be configured to generate power by converting a direct current (DC) voltage to an alternating current (AC) voltage using a resonance frequency.

The control/communication unit may be further configured to: assign a control identifier (ID) to the target device, and determine an amount of a reference power based on a battery state of the target device to which the control ID is assigned, wherein the control ID is to identify the target device, and the reference power is supplied to the power amplifier.

According to a further aspect, a power receiving method of a wireless power transmission and charging system may include: receiving a charging power for the charging operation from the source device; transmitting, to the source device, information on an amount of a received power, or information on a change in a temperature of a target device, based on a request of the source device; and receiving the charging power from the source device, after the source device adjusts a voltage supplied to a power amplifier of the source device based on the information on the amount of the received power or the information on the change in the temperature of the target device.

The power receiving method may further include: receiving a wake-up power and a wake-up request message from the source device; and transmitting, to the source device, an acknowledge (ACK) message in response to the wake-up request message.

The power receiving method may further include: receiving, from the source device, an assigned control identifier (ID), the control ID being used in a charging operation.

The receiving of the assigned control ID may include: receiving an access standard instruction comprising an access standard required to identify a plurality of target devices; creating a temporary ID of a target device based on a value set in a reference point field, a value set in a call argument field, and a value set in a movement argument field, the reference point field, the call argument field, and the movement argument field being included in the access standard instruction; receiving a call parameter generated based on the value set in the call argument field; comparing the temporary ID with the call parameter; transmitting, to the source device, a response signal in response to the call parameter, when the temporary ID is identical to the call parameter; and receiving the assigned control ID from the source device.

The power receiving method may further include: receiving an access standard instruction from the source device, when the source device determines, based on a plurality of response signals, that a plurality of target devices have identical temporary IDs, the access standard instruction being updated by changing the value set in the movement argument field; and updating the temporary IDs of the target devices based on the received access standard instruction.

Other features and aspects will be apparent from the following detailed description, the drawings, and the claims.

BRIEF DESCRIPTION OF THE DRAWINGS

FIGS. 4A and 4B are diagrams illustrating a basic format of an access standard instruction.

FIG. 15 illustrates a system information area of a source.

FIG. 16 illustrates a system information area of a target.

FIG. 19A is a diagram illustrating a distribution of a magnetic field within a source resonator based on feeding of a feeding unit.

Figure 1:
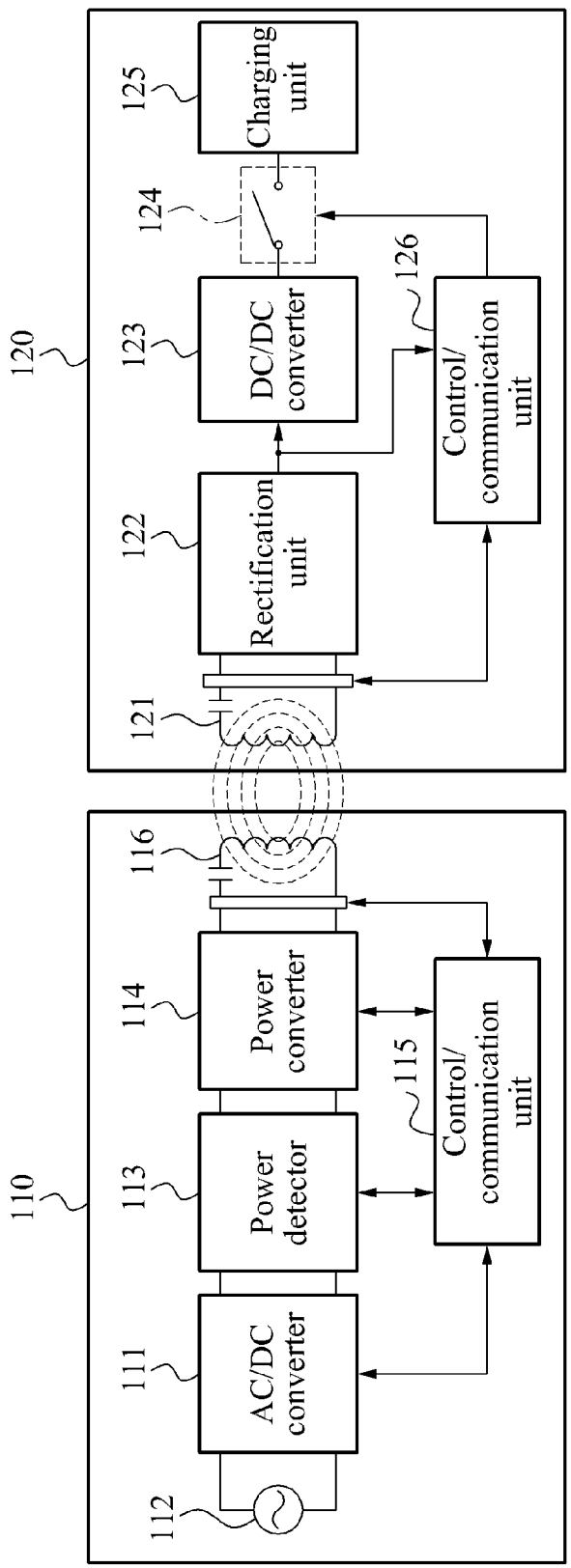
FIG. 1 is a diagram illustrating a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a wireless power transmission and charging system.

As shown, the wireless power transmission and charging system includes a source device 110, and a target device 120.

The source device 110 may include an alternating current-to-direct current (AC/DC) converter 111, a power detector 113, a power converter 114, a control/communication unit 115, and a source resonator 116.

The target device 120 may include a target resonator 121, a rectification unit 122, a DC-to-DC (DC/DC) converter 123, a switch unit 124, a charging unit 125, and a control/communication unit 126.

The AC/DC converter 111 may be configured to generate DC voltage by rectifying AC voltage (e.g., in a band of tens of hertz (Hz)) output from a power supply 112. The AC/DC converter 111 may output DC voltage of a predetermined level, may adjust an output level of the DC voltage based on the control of the control/communication unit 115, or both.

The power detector 113 may be configured to detect an output current and an output voltage of the AC/DC converter 111, and may transfer, to the control/communication unit 115, information on the detected current and the detected voltage. Additionally, the power detector 113 may detect an input current and an input voltage of the power converter 114.

The power converter 114 may be configured to generate power by converting DC voltage of a predetermined level to AC voltage, for instance, using a switching pulse signal in a band of a few megahertz (MHz) to tens of MHz. In some embodiments, the power converter 114 may convert DC voltage supplied to a power amplifier to AC voltage, using a reference resonance frequency $F_{Ref}$, and may generate a power.

In some embodiments, the impedance adjusting unit may be included which include N matching switches connected to a plurality of capacitors. The impedance adjusting unit may adjust an impedance of the source resonator 116 by turning ON or OFF the N matching switches. The impedance adjusting unit may include a Pi matching circuit or a T matching circuit.

The control/communication unit 115 may be configured to detect a reflected wave of a transmission power, and may detect mismatching between the target resonator 121 and the source resonator 116 based on the detected reflected wave. To detect the mismatching, the control/communication unit 115 may detect an envelope of the reflected wave, detect a power amount of the reflected wave, or both.

For example, the control/communication unit 115 may be configured to compute a voltage standing wave ratio (VSWR), based on a voltage level of the reflected wave, and based on a level of an output voltage of the source resonator 116 or the power converter 114. For example, when the VSWR is less than a predetermined value, the control/communication unit 115 may be configured to determine that the mismatching is detected. In this example, the control/communication unit 115 may turn ON or OFF the N matching switches, may determine a tracking impedance $Im_{Best}$ with the best power transmission efficiency, and may adjust the impedance of the source resonator 116 to the tracking impedance $Im_{Best}$.

Additionally, the control/communication unit 115 may adjust a frequency of a switching pulse signal. Under the control of the control/communication unit 115, the frequency of the switching pulse signal may be determined. By controlling the power converter 114, the control/communication unit 115 may generate a modulation signal to be transmitted to the target device 120. The control/communication unit 115 may transmit various messages to the target device 120 via in-band communication. Additionally, the control/communication unit 115 may detect a reflected wave, and may demodulate a signal received from the target device 120 through an envelope of the detected reflected wave.

The control/communication unit 115 may generate a modulation signal for in-band communication, using various schemes. To generate a modulation signal, the control/communication unit 115 may turn ON or OFF a switching pulse signal, or may perform delta-sigma modulation. Additionally, the control/communication unit 115 may generate a pulse-width modulation (PWM) signal with a predetermined envelope.

The control/communication unit 115 may perform out-band communication using a communication channel. The control/communication unit 115 may include a communication module, such as one configured to process ZigBee, Bluetooth, Wi-Fi, Wi-Max, near field communication (NFC), radio frequency identification (RFID), and/or the like communications. The control/communication unit 115 may transmit or receive data to or from the target device 120 via the out-band communication.

The source resonator 116 may transfer an electromagnetic energy to the target resonator 121. In one or more embodiments, the source resonator 116 may transfer, to the target device 120, communication power used for communication or charging power used for charging, for instance, via a magnetic coupling with the target resonator 121.

The target resonator 121 may receive the electromagnetic energy from the source resonator 116. For example, the target resonator 121 may receive, from the source device 110, the communication power or charging power via the magnetic coupling with the source resonator 116. Additionally, the target resonator 121 may receive various messages from the source device 110 via the in-band communication.

The rectification unit 122 may generate a DC voltage by rectifying an AC voltage. Here, the AC voltage may be received from the target resonator 121.

The DC/DC converter 123 may adjust a level of the DC voltage output from the rectification unit 122, based on a capacity of the charging unit 125. For example, the DC/DC converter 123 may adjust, to 3 to 10 V, the level of the DC voltage output from the rectification unit 122.

The switch unit 124 may be turned ON or OFF, under the control of the control/communication unit 126. When the switch unit 124 is turned OFF, the control/communication unit 115 of the source device 110 may detect a reflected wave. In other words, when the switch unit 124 is turned OFF, the magnetic coupling between the source resonator 116 and the target resonator 121 may be eliminated.

The charging unit 125 may include at least one battery. The charging unit 125 may charge the battery using a DC voltage output from the DC/DC converter 123.

The control/communication unit 126 may perform in-band communication for transmitting or receiving data using a resonance frequency. During the in-band communication, the control/communication unit 126 may demodulate a received signal by detecting a signal between the target resonator 121 and the rectification unit 122, or detecting an output signal of the rectification unit 122. The control/communication unit 126 may demodulate a message received via the in-band communication.

Additionally, the control/communication unit 126 may adjust an impedance of the target resonator 121, to modulate a signal to be transmitted to the source device 110. The control/communication unit 126 may modulate the signal to be transmitted to the source device 110, by turning ON or OFF the switch unit 124. For example, the control/communication unit 126 may increase the impedance of the target resonator 121, so that a reflected wave may be detected from the control/communication unit 115 of the source device 110. Depending on whether the reflected wave is detected, the control/communication unit 115 may detect a binary number (e.g., "0" or "1.").

The control/communication unit 126 may transmit a response message to a wireless power transmitter. The response message may include, for example, a "type of a corresponding target device," "information on a manufacturer of a corresponding target device," "a model name of a corresponding target device," a "battery type of a corresponding target device," a "scheme of charging a corresponding target device," an "impedance value of a load of a corresponding target device," "information on characteristics of a target resonator of a corresponding target device," "information on a frequency band used by a corresponding target device," an "amount of a power consumed by a corresponding target device," an "identifier (ID) of a corresponding target device," or "information on version or standard of a corresponding target device."

The control/communication unit 126 may also perform out-band communication using a communication channel. The control/communication unit 126 may include a communication module, such as one configured to process ZigBee, Bluetooth, Wi-Fi, Wi-Max and/or the like communications. The control/communication unit 126 may transmit or receive data to or from the source device 110 via the out-band communication, for instance.

The control/communication unit 126 may be configured to receive a wake-up request message from the wireless power transmitter, may detect an amount of a power received to the target resonator 121, and may transmit, to the wireless power transmitter, information on the detected amount of the power. The information on the detected amount may include, for example, an input voltage value and an input current value of the rectification unit 122, an output voltage value and an output current value of the rectification unit 122, an output voltage value and an output current value of the DC/DC converter 123, and the like.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

Figure 2:
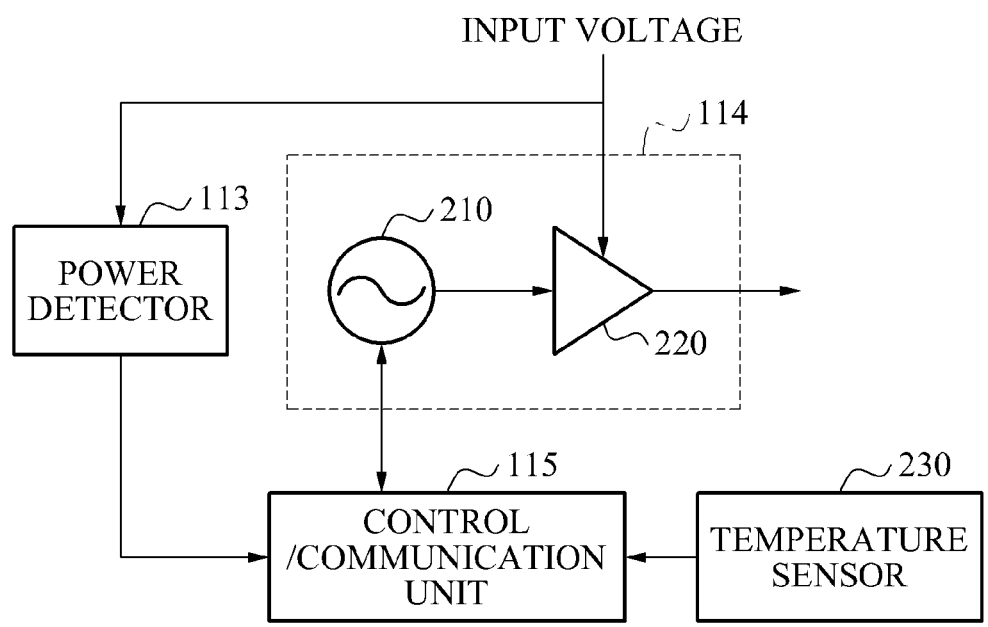
FIG. 2 is a diagram illustrating, in greater detail, a source device of FIG. 1.

FIG. 2 further illustrates one configuration of the wireless power transmitter.

Referring to FIG. 2, the wireless power transmitter may further include a temperature sensor 230. The temperature sensor 230 may be configured to measure and/or sense a temperature of a surrounding area of the power converter 114, or a temperature inside the wireless power transmitter, and may transfer data regarding the sensed temperature to the control/communication unit 115. For example, the temperature sensor 230 may include a thermometer or thermocouple. As illustrated in FIG. 2, the power converter 114 includes a switching pulse signal generator 210, and a power amplifier 220.

The switching pulse signal generator 210 may generate a switching pulse signal in a band of a few MHz to tens of MHz, for instance. The frequency of the generated switching pulse signal may be determined, under the control of the control/communication unit 115. For example, when a reference resonance frequency $F_{Ref}$ of the source resonator 116 is set to 13.56 MHz or 5.78 MHz, the control/communication unit 115 may control the switching pulse signal generator 210, so that the frequency of the switching pulse signal may be set to 13.56 MHz or 5.78 MHz. The switching pulse signal generator 210 may include a plurality of capacitors, and a switch, for example. The switching pulse signal generator 210 may adjust the frequency of the switching pulse signal by switching the plurality of capacitors.

The power amplifier 220 may generate an AC power by a switching pulse signal output from the switching pulse signal generator 210. For instance, the power amplifier 220 may generate a communication power for communication, or a charging power for charging, by adjusting an input voltage of the power amplifier 220 of FIG. 2 based on the switching pulse signal. The power converter 114 may generate, using the power amplifier 220, a charging power used to charge a target device to which a control identifier (ID) is assigned. The communication power may be, for example, a wake-up power.

Figure 3:
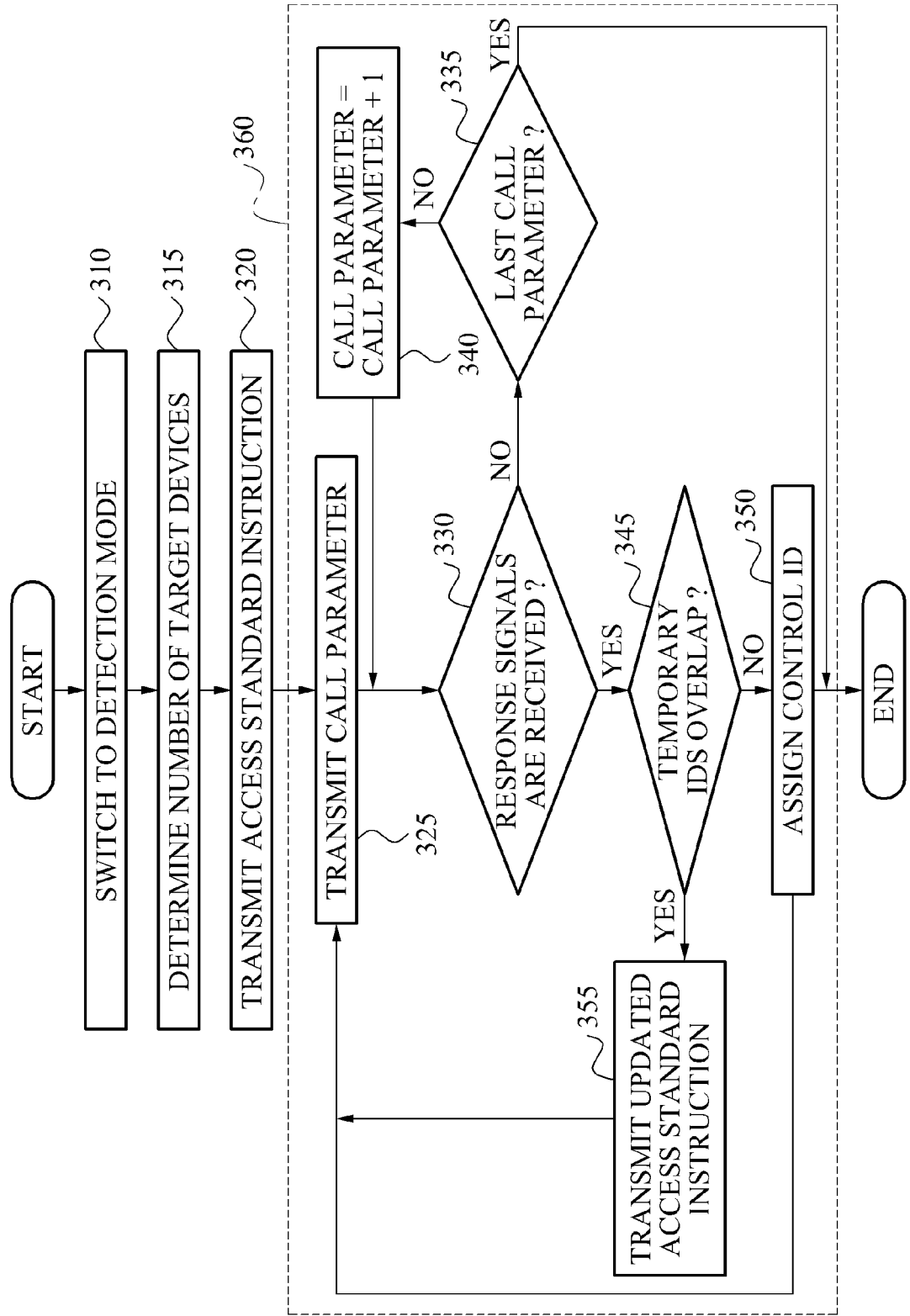
FIG. 3 is a flowchart illustrating a power control method of a wireless power transmission and charging system.

The control/communication unit 115 may determine an amount of a reference power supplied to the power amplifier 220, based on a battery state of the target device to which the control ID is assigned. The wireless power transmitter may determine a battery state and battery specification of a target device, and an amount of a power required to charge the battery, through an operation of assigning a control ID as illustrated in FIG. 3. The amount of the reference power may be determined based on the battery state, the battery specification, and the amount of the power required to charge the battery.

The control/communication unit 115 may adjust a signal level of the input voltage of the power amplifier 220, based on a number of target devices. Additionally, the control/communication unit 115 may adjust the reference resonance frequency $F_{Ref}$ based on a reflected wave of the charging power, an amount of a power received to each of the target devices, an amount of the charging power, and/or a transmission efficiency of the charging power.

The control/communication unit 115 may detect a change in a current input to the power amplifier 220, a change in a temperature of the source device 110, a change in an amount of a power received to the target device 120, or a change in a temperature of the target device 120. The power detector 113 may detect an amount of a power supplied to the power amplifier 220, and may report the detected amount of the power to the control/communication unit 115.

The control/communication unit 115 may adjust the voltage supplied to the power amplifier 220, based on the change in the current input to the power amplifier 220, the change in the temperature of the source device 110, the change in the amount of the power received to the target device 120, or the change in the temperature of the target device 120. In some embodiments, the control/communication unit 115 may adjust the voltage supplied to the power amplifier 220, so that a reference power of a predetermined level may be supplied to the power amplifier 220. For example, when a charging state of the target device 120 is changed, or when the temperature of the source device 110 is changed, the current input to the power amplifier 220 may be changed, and thus an output current value of the power amplifier 220 may be changed. Accordingly, the control/communication unit 115 may detect an environmental change, and may adjust the voltage supplied to the power amplifier 220, so that a reference power of a predetermined level may be supplied to the power amplifier 220 despite the environmental change.

The control/communication unit 115 may adjust the voltage supplied to the power amplifier 220, using a lookup table. The lookup table may be configured to store an amount of the voltage to be adjusted based on the change in the temperature of the source device 110. For example, the lookup table may include, for example, data obtained by mapping an amount of the adjusted input voltage of the power amplifier 220 to an amount of the change in the temperature of the source device 110.

The change in the temperature of the target device 120 may be detected based on data received from the target device 120. The source device 110 may continue to transmit the charging power for a predetermined period of time, and may then send a request for temperature information to the target device 120. In response to the request for the temperature information, the target device 120 may transmit, to the source device 110, data regarding the temperature of the target device 120. Similarly, the change in the amount of the power received to the target device 120 may be detected, based on data received from the target device 120, a pre-measured power transmission efficiency, and an output power amount of the power amplifier 220. Prior to transmitting the charging power, the power transmission efficiency may be measured. For example, when the amount of the power received to the target device 120 is less than a value obtained by multiplying the power transmission efficiency and the output power amount of the power amplifier 220, the control/communication unit 115 may increase the input voltage of the power amplifier 220. The temperature information, and the amount of the received power may be requested at regular intervals.

FIG. 3 illustrates an example of a power control method of a wireless power transmission and charging system.

As used herein, the term "source" is used to simply refer to a source device, and the term "target" is used to simply refer to a target device. A source device may be used to supply a wireless power, and may include all electronic devices enabling power supply, for example, a pad, a terminal, a TV, and/or the like. A target device may be used to receive a supplied wireless power, and may include all electronic devices requiring a power.

Referring to FIG. 3, in operation 310, the source, namely a wireless power transmitter, is switched from a standby mode to a detection mode, by a charging start button or a detection by a sensor. In the standby mode, the source may not perform any operation. In the detection mode, operations 310 and 315 may be performed.

In operation 315, the source determines a number of target devices. Next, in operation 320, the source may transmit a wake-up power and a wake-up request signal, may receive at least one acknowledge (ACK) message with respect to the wake-up request signal, and may determine the number of target devices based on a number of received ACK messages. The wake-up power may be a power required by a target device to perform a basic communication between the target device and the source. In other words, the target devices may receive the wake-up power and the wake-up request signal from the source, and may transmit response signals in response to the wake-up request signal.

In a situation when the source is switched from the standby mode to the detection mode by the sensor, and at least one ACK message in response to the wake-up request signal is not received from at least one target device within a predetermined period of time, the source may be switched from the detection mode to the standby mode. Accordingly, when an object other than the target device is placed on a pad unit, the source may be activated for a while only, and then may enter the standby mode again.

In operation 360, a control ID used in a charging operation may be assigned to a target device. When a plurality of target devices exist, control IDs may be used to identify the plurality of target devices. Thus, at least one control ID may be used to identify at least one target device during the charging operation.

When operation 360 is completed, the source may transmit a charging power to the target device to which the control ID is assigned, for instance, via a magnetic coupling. The charging power may be used to charge the target device with the control ID. When operation 360 is completed, the source may determine an amount of a reference power supplied to a power amplifier based on a battery state of the target device with the control ID. The battery state of the target device may include a charging state or a discharging state of a battery of the target device. For example, when the battery of the target device is completely discharged, the amount of the reference power may be determined based on a power transmission efficiency and/or a power required to charge the battery.

In some instances, a plurality of target devices may be simultaneously placed on the pad unit, and may be simultaneously charged. Accordingly, there may be provided a method for identifying the plurality of target devices. Operation 360 may be performed to avoid communication collision.

In operation 320, the source transmits an access standard instruction to a plurality of target devices that are detected by the source. When a predetermined period of time elapses after the wake-up power is transmitted to the detected target devices, the source may transmit the access standard instruction to the detected target devices.

The access standard instruction may include a reference point field, a call argument field, and a movement argument field. A value set in the reference point field may indicate a reference point used to create a temporary ID of a target device from a unique ID of the target device. In a situation where a reference point is set in advance between a source and a target device, the reference point field may be omitted from the access standard instruction. On the other hand, when either a most significant bit (MSB) or a least significant bit (LSB) among bits of a unique ID of a target device is set as a reference point, in advance between a source and the target device, the reference point field may also be omitted from the access standard instruction.

Additionally, a value set in the call argument field may indicate n consecutive bits starting from the reference point. A value set in the movement argument field may indicate a number of bits corresponding to movement of the reference point.

Target devices may create their respective temporary IDs using a portion of their own IDs based on an access standard.

In operation 325, the source transmits a call parameter to the detected target devices. The call parameter may be determined based on a call argument included in the access standard instruction. For example, when the call argument is set to "3," the call parameter may have a value from "000" to "111." The source may sequentially transmit, to the detected target devices, call parameters having values of "000" to "111," or call parameters having values of "111" to "000." Additionally, the source may transmit, to the detected target devices, an instruction corresponding to the call parameter. The instruction corresponding to the call parameter may include, for example, an instruction to call a temporary ID of a target device.

In operation 330, the source determines whether a plurality of response signals are received from the detected target devices. For example, when a temporary ID of a target device is identical to the call parameter, the target device may transmit, to the source, a response signal. The response signal may be an ACK signal. When a response signal is received, the source may acquire information on a temporary ID of a target device.

When no response signal is received from the detected target devices, the source determines whether the call parameter transmitted in operation 325 is a last call parameter in operation 335. When the call parameter transmitted in operation 325 is determined to be the last call parameter, the source may terminate the power control method of FIG. 3. For example, when a call argument is set to "3," the source may transmit call parameters having values of "000" to "111." The call parameter "111" may correspond to the last call parameter. Additionally, when the call parameter transmitted in operation 325 is determined to be the last call parameter, the source may determine the detected target devices as targets that do not require charging, or as targets that are not compatible with the source.

When the call parameter transmitted in operation 325 is not the last call parameter, the source updates the call parameter by changing the call parameter by "1" in operation 340. Additionally, the source may transmit the updated call parameter to the detected target devices. For example, after transmitting a call parameter having a value of "010," the source may update the value of the transmitted call parameter to "011" by adding "1" to the transmitted call parameter, because the transmitted call parameter is not the last call parameter having a value of "111." The source may transmit the updated call parameter with the value of "011" to the detected target devices.

When the response signals are received from the target devices, the source determines whether temporary IDs of the target devices overlap based on the response signals in operation 345. For example, when a plurality of response signals are received in response to a call parameter within a predetermined period of time, the source may determine that the temporary IDs of the target devices overlap.

When it is determined that the temporary IDs do not overlap, the source assigns control IDs to target devices that transmit the response signals, in operation 350. A control ID may be assigned to a target device, so that the source may independently control the target device to which the control ID is assigned. For example, the source may individually transmit a power to the target device with the control ID, and may transmit or receive required data to or from the target device with the control ID. Subsequently, the source may transmit the call parameter to target devices other than the target device with the control ID in the same manner as operation 325, until control IDs are respectively assigned to all of the detected target devices. A currently transmitted call parameter may be updated from a previously transmitted call parameter.

When it is determined that the temporary IDs overlap, that is, are identical, the source transmits an updated access standard instruction to the target devices with the identical temporary IDs in operation 355. The source may update the access standard instruction by changing at least one of the reference point, the call argument, and the movement argument. The target devices with the identical temporary IDs may update their temporary IDs based on the updated access standard instruction.

Subsequently, the source may transmit the call parameter to the target devices with the identical temporary IDs in the same manner as operation 325. The source may repeat operations 310 to 325 until control IDs are respectively assigned to all of the detected target devices, as needed.

As described above, with reference to FIGS. 2 and 3, to control a power in the wireless power transmission and charging system, a control ID used to identify at least one target device during a charging operation may be assigned by the source device 110 to the target device. Additionally, an amount of a reference power supplied to the power amplifier 220, based on a battery state of the target device to which the control ID is assigned. Furthermore, a charging power used to charge the target device to which the control ID is assigned may be generated using the power amplifier 220, and may be transmitted to the target device via a magnetic coupling. Moreover, a change in a current input to the power amplifier 220, a change in a temperature of the source device 110, a change in an amount of a power received to the target device, or a change in a temperature of the target device may be detected.

The power control method of the wireless power transmission and charging system may be performed by a target device. When a source device is switched from the standby mode to the detection mode, the target device may receive, from the source device, a wake-up power and a wake-up request message. Additionally, the target device may transmit, to the source device, an ACK message in response to the wake-up request message. The target device may receive a control ID that is assigned by the source device and that is to be used in a charging operation. Furthermore, the target device may receive a charging power for the charging operation from the source device via a magnetic coupling. In response to a request of the source device, the target device may transmit, to the source device, information on an amount of a received power, or information on a change in a temperature of the target device. Moreover, the target device may receive the charging power from the source device, after the source device adjusts a voltage supplied to a power amplifier of the source device based on the information on the amount of the received power or the information on the change in the temperature of the target device.

It may be possible to increase power transmission efficiency by controlling a power supplied to a target device. Additionally, it may be possible to efficiently identify a target device by using, as a temporary ID of the target device, a portion of a unique ID of the target device that contains characteristics of the target device.

Furthermore, a source device may independently transmit a wireless power and data to a target device by assigning a control ID to the target device.

Figure 4A:
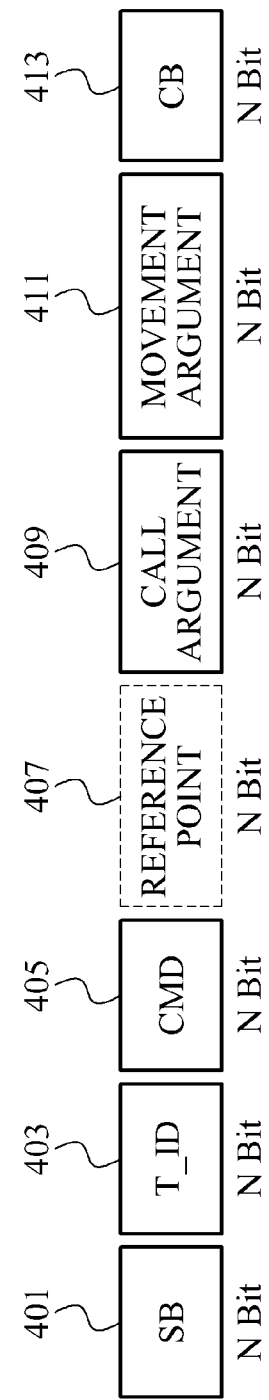

FIGS. 4A and 4B illustrate a basic format of an access standard instruction.

Specifically, FIG. 4A illustrates fields included in an access standard instruction. The access standard instruction may include, for example, a start bit (SB) field 401, a target ID (T_ID) field 403, a command (CMD) field 405, a reference point field 407, a call argument field 409, a movement argument field 411, and a check bit (CB) field 413. A target device may receive an access standard through the access standard instruction, and may generate information used to identify target devices.

The SB field 401 may include a bit-type identifier indicating the beginning of a packet. For example, N bits may be assigned to the SB field 401 based on a size of the entire packet.

When a control ID is assigned to a target device, the T_ID field 403 may include the control ID. On the other hand, when a control ID is not assigned to a target device, the T_ID field 403 may include a null value.

The CMD field 405 may include an instruction used to define an operation of a source. The instruction may include, for example, a reset instruction, an instruction to request an input voltage and input current of a target device, an instruction to request an output voltage and output current of a DC-to-DC converter of a target device, an ACK instruction, an instruction to request a load of a target device to be powered on, an instruction to request a load of a target device to be powered OFF, an instruction to request state information of a target device, an instruction to transfer an access standard, a negative acknowledge (NACK) instruction, an instruction to assign a control ID, an instruction to request registration information of a target device, and/or the like. Additionally, a code may be assigned to each instruction. Since FIG. 4A illustrates the access standard instruction, the CMD field 405 may include the access standard instruction. Various bits may be assigned to the CMD field 405 based on a number of instructions.

The reference point field 407 may include a reference point. The reference point may refer to a reference used to create a temporary ID of a target device from a unique ID of the target device. The reference point may be, for example, an MSB or an LSB among bits of the unique ID of the target device. Additionally, the reference point may represent a predetermined position of the unique ID of the target device. When a reference point is set in advance between a source and a target device, the reference point field 407 may be omitted from the access standard instruction. And when an MSB or an LSB among bits of a unique ID of a target device is set as a reference point in advance, the reference point field 407 may also be omitted from the access standard instruction. As illustrated in FIG. 4A, the reference point field 407 is denoted by a dotted line box, because the reference point field 407 may be omitted from the access standard instruction.

The call argument field 409 may include a call argument. The call argument may indicate n consecutive bits starting from the reference point. A call parameter may be a value used when a source calls predetermined bits from a target device. The call parameter may be determined based on the call argument. For example, when the call argument is set to "3," the call parameter may have a value from "000" to "111."

The movement argument field 411 may include a movement argument. The movement argument may indicate a number of bits corresponding to movement of the reference point, and thus may indicate how much the reference point moves. For example, when a movement argument is set to "1," a reference point may move to the right or the left by 1 bit. A number of bits assigned to the movement argument field 411 may be adjusted based on the size of the entire packet.

The CB field 413 may include a check bit used to verify accurate transmission of a packet.

Additionally, the access standard instruction may include various fields, in addition to the reference point field 407, the call argument field 409, and the movement argument field 411. For example, the access standard instruction may include various fields assigned in bits or bytes.

FIG. 4B illustrates, in detail, the reference point field 407, the call argument field 409, and the movement argument field 411. The reference point may be set in the reference point field 407. When a reference point is set to an MSB, "M" or "1" may be set in a reference point field, as illustrated in FIG. 4B. And when a reference point is set to an LSB, "L" or "0" may be set in the reference point field, as illustrated in FIG. 4B. Additionally, the call argument may be set in the call argument field 409. The call argument may be determined based on a number of detected target devices, and may have a value of "1" to "n," as illustrated in FIG. 4B. The movement argument may be set in the movement argument field 411. The movement argument may be determined based on the number of the detected target devices similarly to the call argument, and may have a value of "0" to "n," as illustrated in FIG. 4B.

Figure 5:
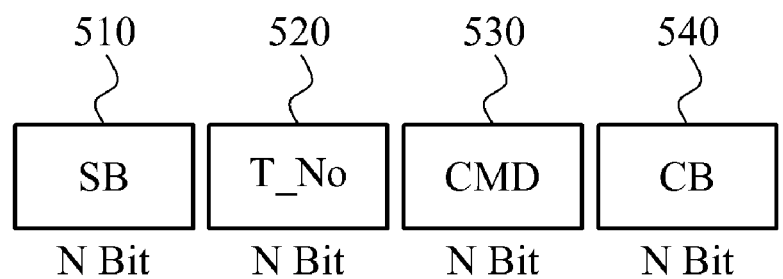
FIG. 5 is a diagram illustrating a basic format of an ID assignment instruction.

FIG. 5 illustrates a basic format of an ID assignment instruction.

Referring to FIG. 5, the ID assignment instruction includes an SB field 510, a control ID (T_No) field 520, a CMD field 530, and a CB field 540. It may be configured as a communication packet.

The SB field 510 may include a bit-type identifier indicating the beginning of a packet. For example, N bits may be assigned to the SB field 510 based on a size of the entire packet.

The T_No field 520 may include a control ID assigned by a source to a target device. Based on the control ID of the T_No field 520, the target device may acquire an ID that may be communicated independently of the source.

The CMD field 530 may include an instruction used to define an operation of a source. Since FIG. 5 illustrates the ID assignment instruction, the CMD field 530 may include the ID assignment instruction. A code may be assigned to an instruction.

The CB field 540 may include a check bit used to verify accurate transmission of a packet.

Additionally, the ID assignment instruction may include various fields, in addition to the SB field 510, the T_No 520, the CMD field 530, and the CB field 540. For example, the ID assignment instruction may include various fields assigned in bits or bytes.

Figure 6:
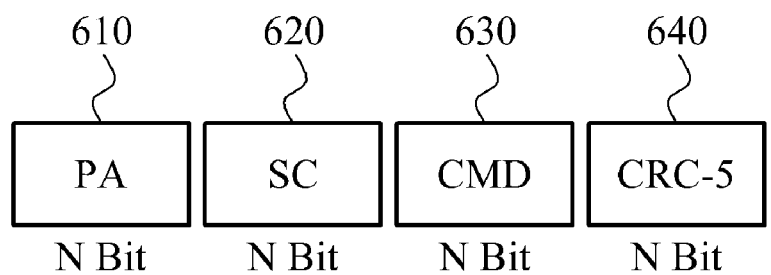
FIG. 6 is a diagram illustrating a basic format of a response instruction of a target device.

FIG. 6 illustrates a basic format of a response instruction of a target device.

Referring to FIG. 6, the response instruction includes a preamble (PA) field 610, a start code (SC) field 620, a CMD field 630, and a cyclic redundancy checking (CRC)-5 field 640. It may be configured as a communication packet. The PA field 610 may include dummy data that is optionally transmitted to prevent a loss of a wireless packet.

The SC field 620 may include an identifier indicating the beginning of a shortened packet, when a response instruction includes four fields, for example, the PA field 610, the SC field 620, the CMD field 630, and the CRC-5 field 640. In a packet, an address field of a transmitter, an address field of a receiver, a data field, and/or the like may be further included in a response instruction.

The CMD field 630 may include an instruction used to define an operation of a target device. The instruction may include, for example, a reset instruction, an instruction to respond to an input voltage and input current of a target device, an instruction to respond to an output voltage and output current of a DC-to-DC converter of a target device, an ACK instruction, an instruction to respond to state information of a target device, an instruction to respond to registration information of a target device, and the like. Additionally, a code may be assigned to each instruction. Since FIG. 6 illustrates the response instruction, the CMD field 630 may include the response instruction.

The CRC-5 field 640 may include a CRC code used to verify accurate transmission of a packet.

Figure 7:
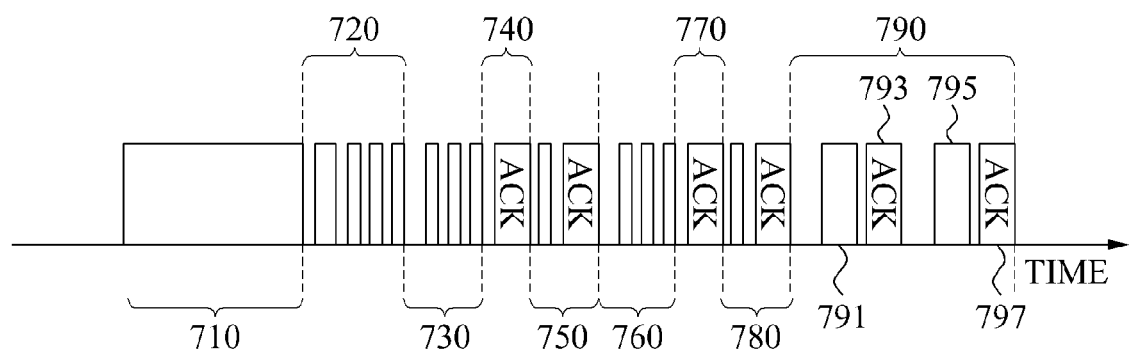
FIG. 7 is a diagram illustrating an operation of a source device and an operation of a target device, based on a time slot, to explain avoidance of communication collision between two target devices.

FIG. 7 illustrates an operation of a source and an operation of a target device, based on a time slot, to explain avoidance of communication collision between two target devices. The source may be configured to simultaneously detect the two target devices. The two target devices may be, for example, a first target device and a second target device.

Referring to FIG. 7, in a period 710, the source may transmit a wake-up power to the first target device and the second target device. The wake-up power may be used to operate controllers of the first target device and the second target device. In response to the wake-up power, the controllers may be operated, so that requirements for transmitting or receiving data to or from the source may be satisfied.

The amount of the wake-up power may be determined based on a maximum number of targets that is included in a system information area of a source illustrated in FIG. 15.

In a period 720, the source may transmit an access standard instruction to the first target device and the second target device. In response to the access standard instruction, the first target device and the second target device may create their respective temporary IDs based on an access standard. To create each of the temporary IDs, a portion of each of unique IDs of the first target device and the second target device may be used. For example, each of the unique IDs of the first target device and the second target device may be included in a serial number area or a short ID area as illustrated in FIG. 16.

In a period 730, the source may transmit a call parameter to the first target device and the second target device. The call parameter may be determined based on a call argument included in the access standard instruction. For example, when the call argument is set to "3," the call parameter may have a value from "000" to "111."

In a period 740, the first target device may transmit, to the source, a response signal in response to the call parameter. When the temporary ID of the first target device is identical to the call parameter, the first target device may transmit the response signal.

In a period 750, the source may assign a control ID to the first target device. The control ID may be set to "1." The first target device with the control ID may transmit, to the source, an ACK signal stating that the assigned control ID is received.

In a period 760, the source may continue to transmit another call argument to the first target device and the second target device. The source may continue to transmit, to the first target device and the second target device, another call parameter subsequent to the call parameter transmitted in the period 730.

In a period 770, the second target device may transmit, to the source, a response signal in response to the call parameter transmitted in the period 760.

In a period 780, the source may assign a control ID to the second target device. The control ID may be set to "2." The second target device with the control ID may transmit, to the source, an ACK signal stating that the assigned control ID is received.

In a period 790, the source may individually transmit a control instruction to the first target device and the second target device to which the control IDs are respectively assigned. The control instruction may include, for example, a charging instruction, a reset instruction, an instruction to check an operation status of a target device, an instruction to request temperature information of a target device, an instruction to request registration information of a target device, and/or the like.

In a time slot 791, the source may transmit a first control instruction to control the first target device. In a time slot 793, the first target device may transmit a response signal in response to the first control instruction. In a time slot 795, the source may transmit a second control instruction to control the second target device. In a time slot 797, the second target device may transmit a response signal in response to the second control instruction.

Figure 8:
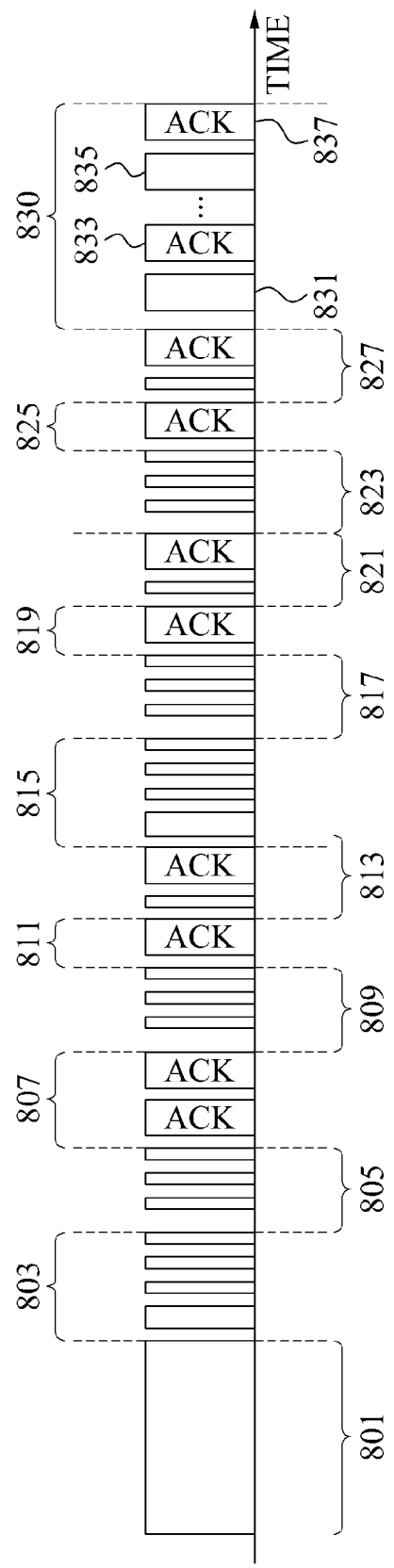
FIG. 8 is a diagram illustrating an operation of a source device and an operation of a target device, based on a time slot, to explain avoidance of communication collision between three target devices.

FIG. 8 illustrates an operation of a source and an operation of a target device, based on a time slot, to explain avoidance of communication collision between three target devices. The source may be configured to simultaneously detect the three target devices. The three target devices may be, for example a first target device, a second target device, and a third target device.

Referring to FIG. 8, in a period 801, the source may transmit a wake-up power to the first target device to the third target device. The wake-up power may be used to operate controllers of the first target device to the third target device. In response to the wake-up power, the controllers may be operated, so that requirements for transmitting or receiving data to or from the source may be satisfied.

In a period 803, the source may transmit an access standard instruction to the first target device to the third target device. In response to the access standard instruction, the first target device to the third target device may create their respective temporary IDs based on an access standard. To create each of the temporary IDs, a portion of each of unique IDs of the first target device to the third target device may be used. For example, each of the unique IDs of the first target device to the third second target device may be included in a serial number area or a short ID area as illustrated in FIG. 16.

In a period 805, the source may transmit a first call parameter to the first target device to the third target device. The first call parameter may be determined based on a call argument included in the access standard instruction. For example, when the call argument is set to "2," the call parameter may have a value from "00" to "11."

In a period 807, the first target device and the second target device may transmit, to the source, two response signals in response to the first call parameter. When the temporary ID of the first target device, and the temporary ID of the second target device are identical to the first call parameter, the first target device and the second target device may transmit the two response signals. Since the two response signals are received, the source may determine that the first target device and the second target device collide.

In a period 809, the source may continue to transmit a second call parameter to the first target device to the third target device. For instance, the source may continue to transmit, to the first target device to the third target device, the second call parameter subsequent to the first call parameter transmitted in the period 805.

In a period 811, the third target device may transmit, to the source, a response signal in response to the second call parameter transmitted by the source in the period 809. When the temporary ID of the third target device is identical to the second call parameter, the third target device may transmit the response signal. Conversely, when the temporary ID of the third target device is different from the second call parameter, the third target device may not transmit a response signal.

In a period 813, the source may assign a control ID to the third target device. The control ID may be set to "1." The third target device with the control ID may transmit, to the source, an ACK signal stating that the assigned control ID is received.

In a period 815, the source may transmit another access standard instruction to the first target device and the second target device that collide. The access standard instruction may include a movement argument field. The source may change a value set in the movement argument field, to identify the first target device and the second target device, so that a new access standard may be agreed between the source and the first target device and the second target device. Additionally, the source may generate a new access standard instruction by changing a value set in a reference point field, or a value set in a call argument field. The first target device and the second target device may receive the new access standard instruction, and may update their respective temporary IDs based on the new access standard.

In a period 817, the source may transmit a third call parameter to the first target device and the second target device. The third call parameter may be determined based on a call argument included in the access standard instruction. Additionally, the call argument may be determined based on a number of target devices detected by the source. For example, when three target devices are detected, the call argument may be set to a value equal to or greater than 2, to identify the three target devices.

In a period 819, the first target device may transmit, to the source, a response signal in response to the third call parameter transmitted by the source in the period 817. When the updated temporary ID of the first target device is identical to the third call parameter, the first target device may transmit the response signal.

In a period 821, the source may assign a control ID to the first target device. The control ID may be set to "2." The first target device with the control ID may transmit, to the source, an ACK signal stating that the assigned control ID is received.

In a period 823, the source may continue to transmit a fourth call parameter to the first target device and the second target device. The source may continue to transmit, to the first target device and the second target device, the fourth call parameter subsequent to the third call parameter transmitted in the period 817.

In a period 825, the second target device may transmit, to the source, a response signal in response to the fourth call parameter transmitted by the source in the period 823. When the updated temporary ID of the second target device is identical to the fourth call parameter, the second target device may transmit the response signal.

In a period 827, the source may assign a control ID to the second target device. The control ID may be set to "3." The second target device with the control ID may transmit, to the source, an ACK signal stating that the assigned control ID is received.

In a period 830, the source may individually transmit a control instruction to the first target device to the third target device to which the control IDs are respectively assigned. The control instruction may include, for example, a charging instruction, a reset instruction, an instruction to check an operation status of a target device, an instruction to request temperature information of a target device, an instruction to request registration information of a target device, and/or the like.

Specifically, in a time slot 831, the source may transmit a first control instruction to control the third target device. In a time slot 833, the third target device may transmit a response signal in response to the first control instruction. In a time slot 835, the source may transmit a second control instruction to control the second target device. In a time slot 837, the second target device may transmit a response signal in response to the second control instruction.

Figure 9:
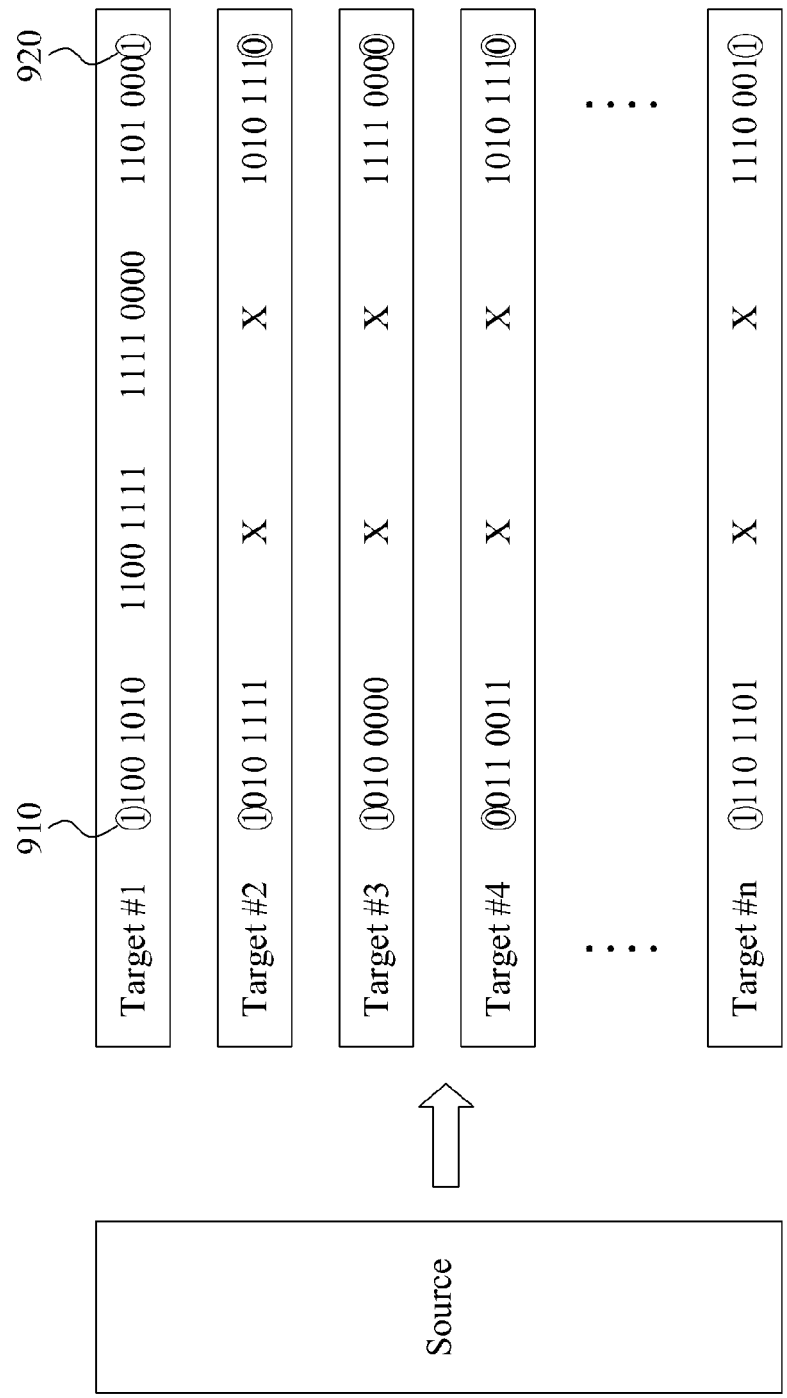
FIG. 9 is a diagram illustrating a reference point in an operation of identifying target devices to avoid communication collision.

FIG. 9 illustrates a reference point in an operation of identifying target devices to avoid communication collision.

A source may transmit an access standard instruction to a plurality of target devices. The access standard instruction may include a reference point field. A value set in the reference point field may indicate a reference point, and the reference point may refer to a reference used to create a temporary ID of a target device from a unique ID of the target device. The reference point may include, for example, an MSB or an LSB among bits of the unique ID of the target device. For example, the unique ID of the target device may be included in a serial number area or a short ID area as illustrated in FIG. 16.

As illustrated in FIG. 9, an MSB 910, or an LSB 920 may be set as a reference point of a first target. For example, an access standard instruction may be transmitted to n targets and accordingly, the reference point may equally be applied to the n targets. In a situation where the reference point of the first target is set to the MSB 910, a reference point of a second target may also be set to the MSB 910, not the LSB 920.

Figure 10:
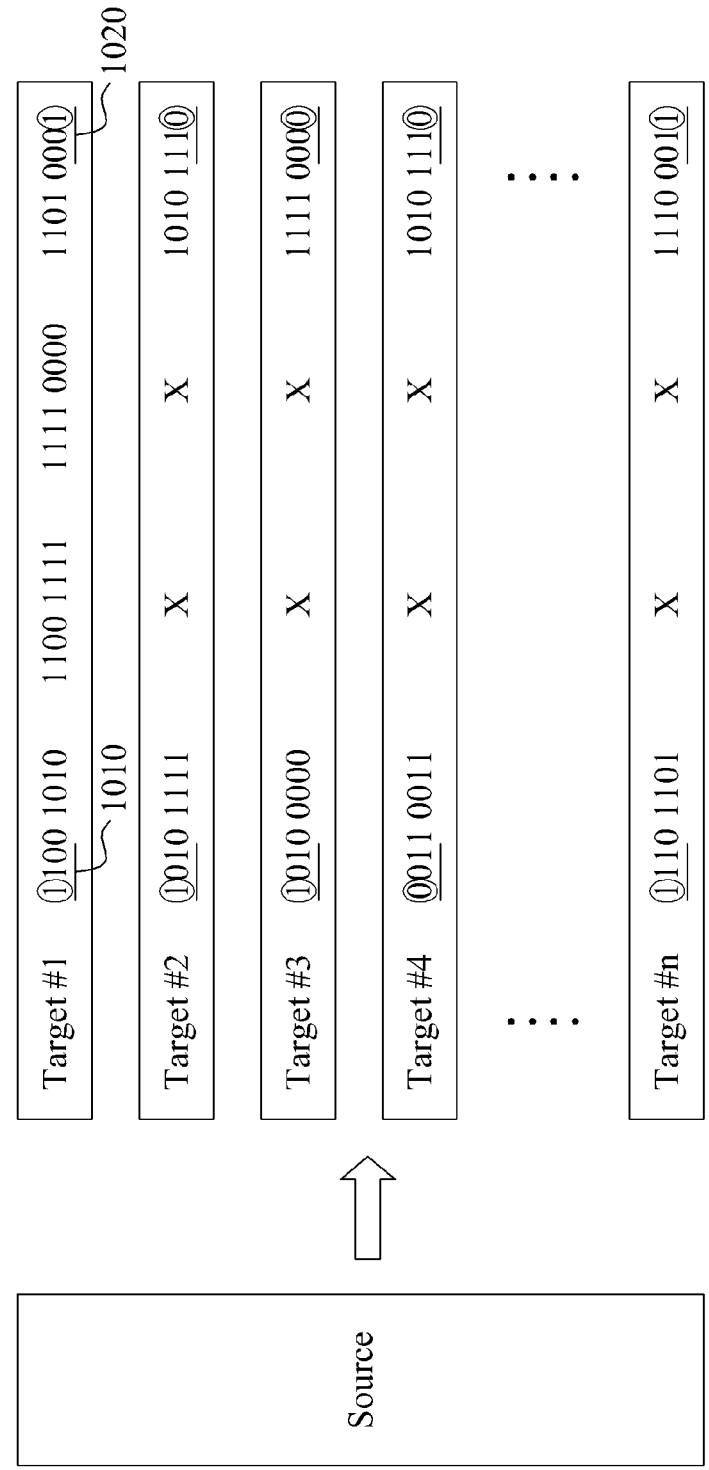
FIG. 10 is a diagram illustrating a call argument and a call parameter in an operation of identifying target devices to avoid communication collision.

FIG. 10 illustrates a call argument and a call parameter in an operation of identifying target devices to avoid communication collision.

A source may transmit an access standard instruction to a plurality of target devices. The access standard instruction may include a call argument field. A value set in the call argument field may indicate a call argument, and the call argument may refer to n consecutive bits starting from a reference point. The call argument may be determined based on a number of target devices detected by the source. For example, when five target devices are detected, a call argument may be set to a value equal to or greater than 3, because eight cases represented by 3 bits may be identified. Additionally, a call parameter may be used to call a predetermined bit from a target device. The call parameter may be determined based on the call argument. For example, when the call argument is set to "3," the call parameter may have a value from "000" to "111".

As illustrated in FIG. 10, a call argument may be set to "3." Accordingly, the source may call three consecutive bits starting from a reference point. The source may call three consecutive bits, rightward starting from an MSB of a unique ID of a target device. In another example, the source may call three consecutive bits, leftward starting from an LSB of the unique ID of the target device. For example, the unique ID of the target device may be included in a serial number area or a short ID area as illustrated in FIG. 16.

Referring to FIG. 10, when the MSB is set as a reference point, the source may call three bits "110" 1010 from a first target. Additionally, when the LSB is set as a reference point, the source may call three bits "001" 1020 from the first target. Since the access standard instruction may equally be applied to n targets, the call argument may need to be equally applied to the n targets.

Figure 11:
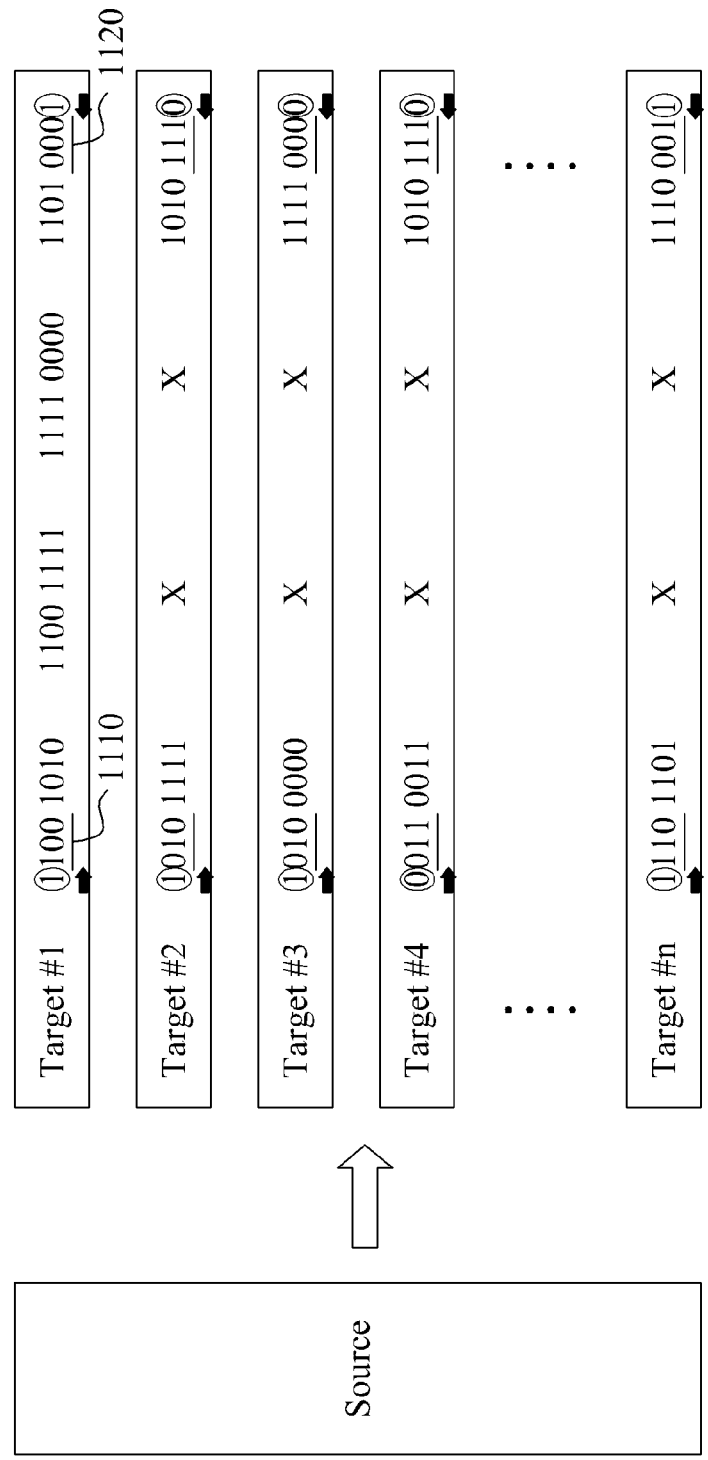
FIG. 11 is a diagram illustrating a movement argument in an operation of identifying target devices to avoid communication collision.

FIG. 11 illustrates a movement argument in an operation of identifying target devices to avoid communication collision.

A source may transmit an access standard instruction to a plurality of target devices. The access standard instruction may include a movement argument field. A value set in the movement argument field may indicate a movement argument, and the movement argument may refer to a number of bits corresponding to movement of the reference point. The movement argument may indicate how much the reference point moves. For example, when the movement argument is set to "1," the reference point may move to the right or the left by 1 bit.

Referring to FIG. 11, the movement argument may be set to "1." Accordingly, a reference point may move to the right or the left by 1 bit. In a situation in which an MSB is set as a reference point, the reference point may move to the right by 1 bit, based on the movement argument. The source may call three bits "100" 1110 from a first target. On the other hand, when an LSB is set as a reference point, the reference point may move to the left by 1 bit, based on the movement argument. For example, the source may call three bits "000" 1120 from the first target. Since the access standard instruction may equally be applied to n targets, the call argument may need to be equally applied to the n targets.

Figure 12:
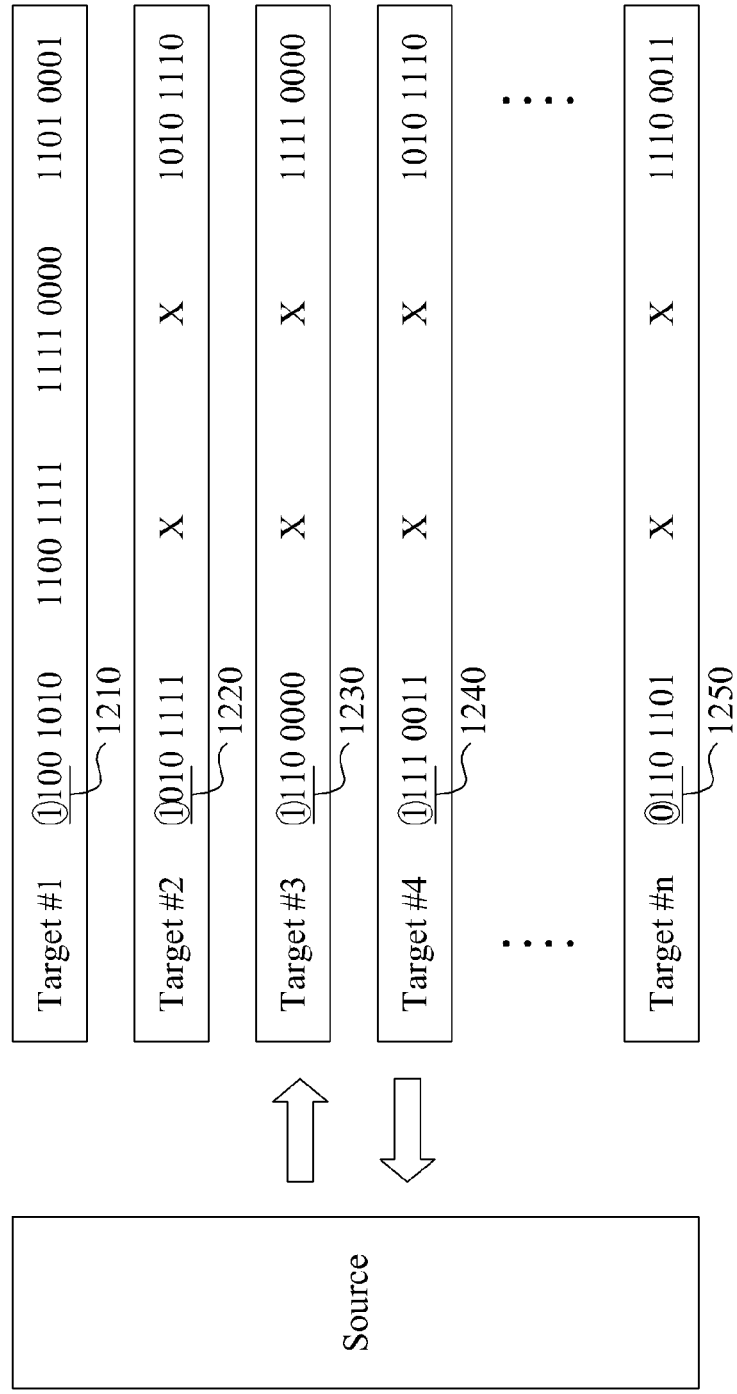
FIG. 12 is a diagram illustrating a situation where temporary IDs of target devices overlap.

FIG. 12 illustrates a situation where temporary IDs of target devices overlap.

A target device may receive an access standard instruction from a source. The target device may create its temporary ID based on an access standard. The access standard may include a reference point, a call argument, and a movement argument.

Referring to FIG. 12, a reference point, a call argument, and a movement argument are set to an MSB, "3," and "0," respectively. Target devices may create their own temporary IDs, based on the reference point, the call argument, and the movement argument. A temporary ID of a first target may be set to "110" 1210, and a temporary ID of a second target may be set to "101" 1220. Additionally, a temporary ID of a third target may be set to "111" 1230, and a temporary ID of a fourth target may be set to "111" 1240. Furthermore, a temporary ID of an n-th target may be set to "011" 1250. The temporary ID of the third target may be identical to the temporary ID of the fourth target, that is, the temporary IDs may overlap.

The source may sequentially transmit call parameters having values of "000" to "111." Additionally, the source may sequentially transmit call parameters having values of "111" to "000." As illustrated in FIG. 12, the source may sequentially transmit call parameters having values of "000" to "111." When temporary IDs of target devices are identical to a call parameter, the target devices may transmit response signals to the source. When the response signals are received, the source may determine whether the received response signals overlap. And, if the response signals do not overlap, the source may assign control IDs to the target devices that transmit the response signals, respectively.

As illustrated in FIG. 12, the temporary ID of the n-th target is less than the temporary IDs of the other targets has the smallest value and accordingly, the source may assign a control ID "1" to the n-th target. The temporary ID of the second target has a second smallest value and accordingly, the source may assign a control ID "2" to the second target. Additionally, the temporary ID of the first target has a third smallest value and accordingly, the source may assign a control ID "3" to the first target.

However, since the temporary ID of the third target overlaps the temporary ID of the fourth target, it may not be possible for the source to assign a control ID to the third target and the fourth target.

Figure 13:
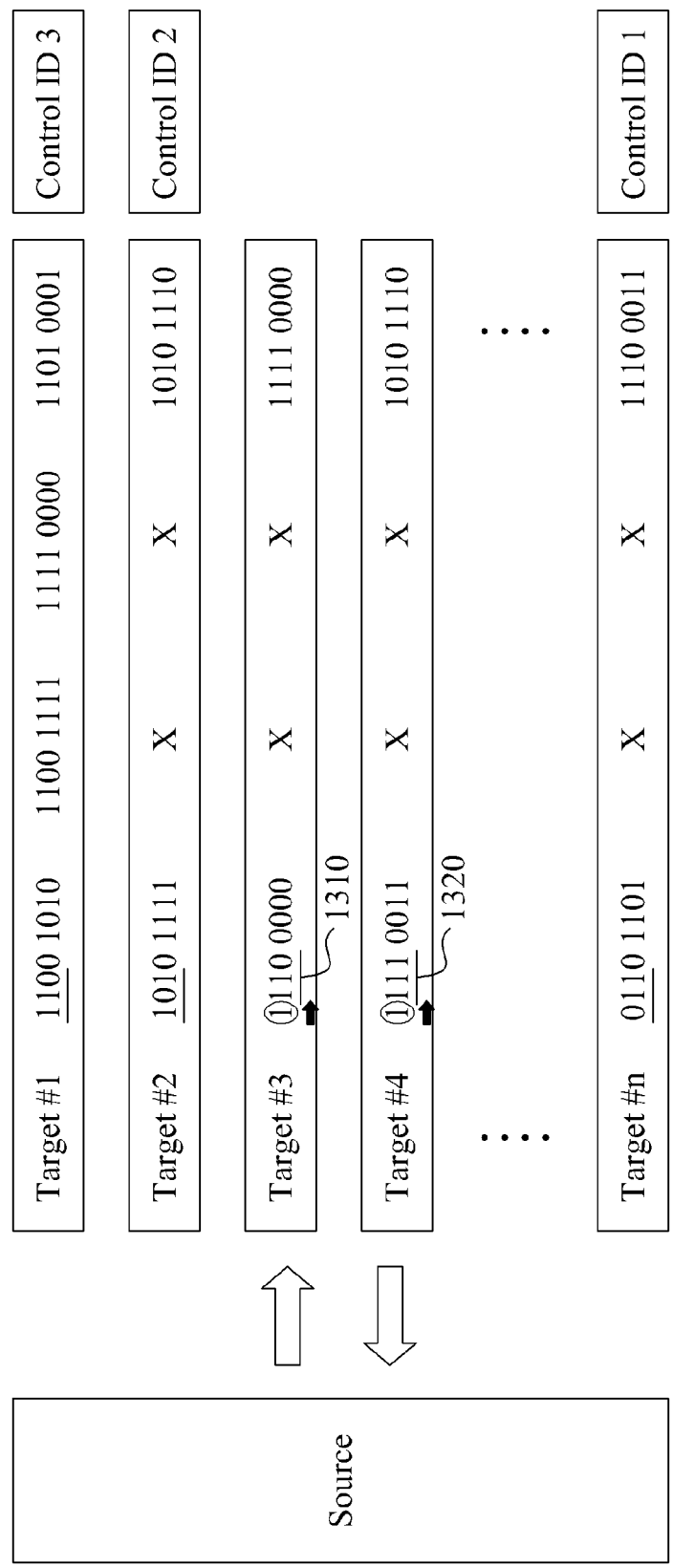
FIG. 13 is a diagram illustrating using a call argument and a changed movement argument, when temporary IDs of FIG. 12 overlap during the operation of identifying target devices to avoid communication collision.

FIG. 13 illustrates using a call argument and a changed movement argument, when the temporary IDs of FIG. 12 overlap during the operation of identifying target devices to avoid communication collision.

The source may generate a call parameter based on a call argument, and may sequentially transmit the call parameter to target devices. For example, when the call argument is set to "3," call parameters having values of "000" to "111" may be generated and the source may sequentially transmit the call parameters having values of "000" to "111" to the target devices. The target devices may compare their temporary IDs to a received call parameter. When the temporary IDs are identical to the call parameter, the target devices may transmit response signals to the source.

The source may receive the response signals, and may determine whether the temporary IDs overlap, based on the received response signals. For example, when the temporary IDs overlap, it may not be possible to assign control IDs to the target devices. Conversely, when the temporary IDs do not overlap, the source may assign control IDs to the target devices, respectively.

Referring to FIG. 13, a reference point, a call argument, and a movement argument are set to an MSB, "3," and "1," respectively. Since control IDs are assigned in advance to the first target, the second target, and the n-th target, respectively, the source may transmit, to the third target and the fourth target, an access standard instruction including the movement argument of "1". The third target and the fourth target may update their temporary IDs based on the reference point, the call argument, and the movement argument. Accordingly, the third target may have a temporary ID "110" 1310, and the fourth target may have a temporary ID "111" 1320.

The source may sequentially transmit call parameters having values of "000" to "111." Since the temporary ID of the third target is identical to a call parameter, the source may assign a control ID "4" to the third target, prior to the fourth target. Subsequently, the temporary ID of the fourth target may be identical to another call parameter, and accordingly the source may assign a control ID "5" to the fourth target. As described above, the source may assign control IDs to the first target to the n-th target, respectively.

Additionally, a final control ID may be assigned based on a maximum number of targets included in the system information area of the source illustrated in FIG. 15.

Figure 14:
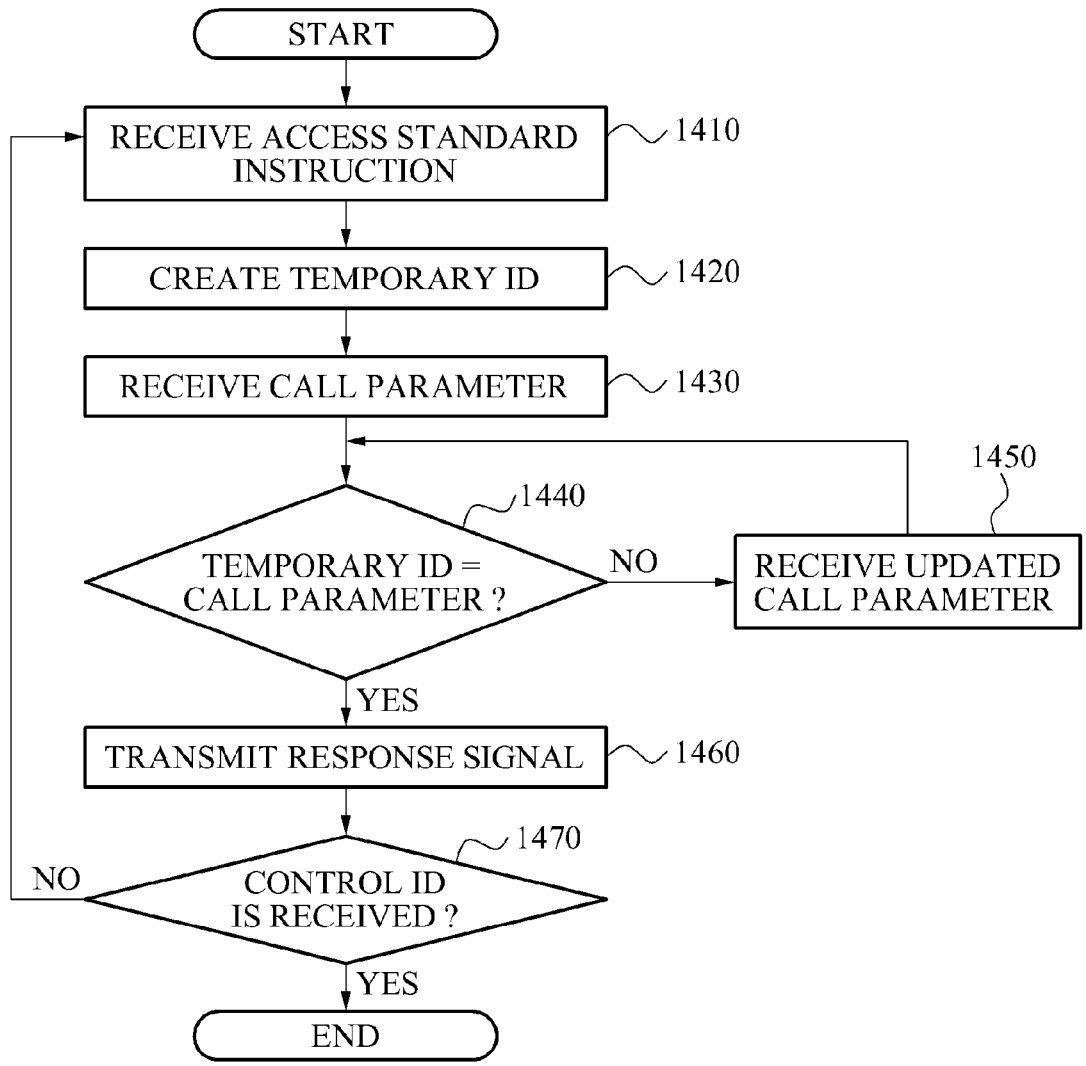
FIG. 14 is a flowchart illustrating a method for avoiding a communication collision in a wireless power transmission.

FIG. 14 illustrates a method for avoiding a communication collision in a wireless power transmission. In some instances, the method of FIG. 14 may be performed by a target device.

In operation 1410, the target device receives an access standard instruction from a source. The access standard instruction may include a reference point field, a call argument field, and a movement argument field.

In operation 1420, the target device creates its temporary ID based on an access standard. For example, the target device may create the temporary ID based on a reference point, a call argument, and a movement argument.

In operation 1430, the target device receives a call parameter from the source. The call parameter may be determined based on a call argument included in the access standard instruction. For example, when the call argument is set to "3," the call parameter may have a value from "000" to "111." The target device may sequentially receive the call parameter having values of "000" to "111." Also, the target device may receive, from the source, an instruction corresponding to the call parameter. The instruction corresponding to the call parameter may include, for example, an instruction to call a temporary ID of a target device.

In operation 1440, the target device determines whether the temporary ID is identical to the received call parameter.

When the temporary ID is different from the received call parameter, the target device does not transmit a response signal in response to the call parameter in operation 1450. Subsequently, the target device may receive an updated call parameter from the source. For example, when the target device has a temporary ID "001," and when a call parameter having a value of "000" is received, the target device may not transmit a response signal in response to the call parameter, and the target device may receive an updated call parameter having a value of "001." On the other hand, if there is no need to charge the target device, or when the target device is not compatible with the source, the target device may not transmit a response signal in response to the call parameter.

When the temporary ID is identical to the received call parameter, the target device transmits a response signal in response to the call parameter in operation 1460.

In operation 1470, the target device determines whether a control ID is received from the source. The target device may receive the control ID from the source within a predetermined period of time, and may terminate the method of FIG. 14. However, when the target device does not receive the control ID within the predetermined period of time, the target device may determine that the temporary ID of the target device is identical to a temporary ID of another target device, or that the response signal is not transferred to the source, and may repeat operations 1410 to 1460.

FIG. 15 illustrates a system information area of a source.

To perform communication between a source and a target, the source and the target may need to have their own IDs, in some instances. Accordingly, the source may call the target, or the target may call the source. Unique IDs may be assigned to the source and the target, respectively.

A unique ID of a source may be included in a system information area of the source, in manufacturing of a product. As illustrated in FIG. 15, the system information area may include, for example, a manufacturer ID area, a product type area, a model type area, a serial number area, a short ID area, and/or a standard version ID area.

The manufacturer ID area may include information on a manufacturer of a product that is operated as a source. The product type area may include information on a type of a product, information on a maximum output size for each product type, and information on a size of a resonator. The model type area may include information on a maximum number of targets that may be charged by a product.

Additionally, the serial number area may include a unique serial number assigned to a product in manufacturing of the product. The unique serial number may include, for example, a production date of the product. The short ID area may include a short ID created based on a unique serial number of a product. The short ID may be created by performing Exclusive OR (EOR), CRC, and/or the like with respect to the unique serial number. For example, when a serial number portion of the entire ID is extended due to a high production amount based on the production type, the short ID may reduce a time required by the source to identify targets.

Furthermore, the standard version ID area may include information on a standard of the source, for example, a maximum output of the source, a number of targets that may be charged by the source, an instruction that may be supported by the source, and/or the like.

The system information area of the source may additionally store information used to identify the source.

The unique ID of the source may refer to a unique serial number of a product, or a short ID.

FIG. 16 illustrates a system information area of a target.

A unique ID of a target may be included in a system information area of the target, in manufacturing of a product. As illustrated in FIG. 16, the system information area may include, for example, a manufacturer ID area, a product type area, a battery type area, a serial number area, a short ID area, and a standard version ID area.

The manufacturer ID area may include information on a manufacturer of a product that is operated as a target. The product type area may include information on a type of a product, such as, for example, a TV, a camera, a mobile phone, or the like. Additionally, the product type area may include information on a charging scheme of a product, and information on power consumption of a product. The battery type area may include information on a type of a rechargeable battery loaded in a product, and information on a current capacity of the rechargeable battery.

Additionally, the serial number area may include a unique serial number assigned to a product in manufacturing of the product. The unique serial number may include, for example, a production date of the product. The short ID area may include a short ID created based on a unique serial number of a product. The short ID may be created by performing EOR, CRC, and/or the like with respect to the unique serial number. For example, when a device for receiving a wireless power exists around the target, the short ID may be used to prevent an error from occurring due to mutual interference.

Furthermore, the standard version ID area may include information on a standard of the target, for example, an instruction that may be supported by the target, information on power consumption, and/or the like.

The system information area of the target may additionally store information used to identify the target.

The unique ID of the target may refer to a unique serial number of a product, or a short ID.

The source and the target may identical each other by transmitting or receiving their own IDs to each other. However, when a unique ID of the source and a unique ID of the target are extended, a large amount of time may be required to identify the source and the target. Thus, a portion of unique IDs may be used to identify multiple targets.

Figure 17A:
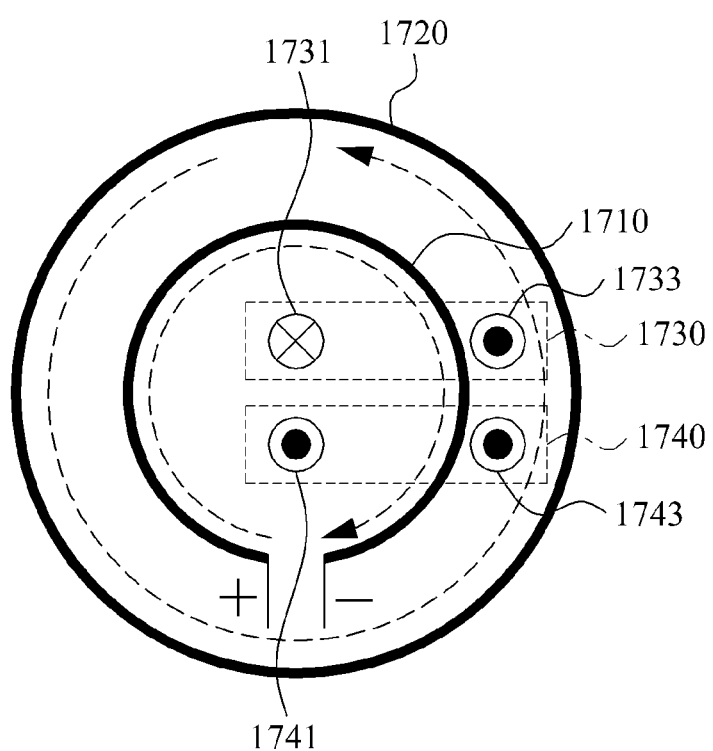
FIGS. 17A and 17B are diagrams illustrating a distribution of a magnetic field in a feeder and a source resonator.
Figure 17B:
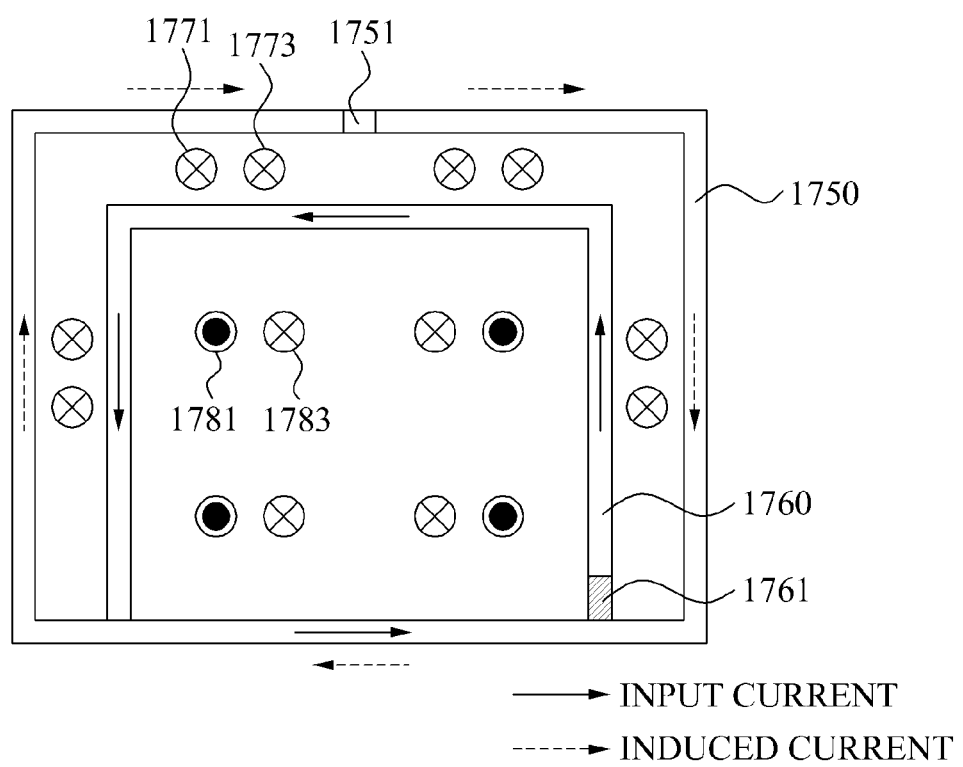

FIGS. 17A and 17B illustrate distributions of a magnetic field in a feeder and a source resonator.

When a source resonator receives power supply through a separate feeder, magnetic fields may be formed in both the feeder and the source resonator.

Referring to FIG. 17A, as an input current flows in a feeder 1710, a magnetic field 1730 may be formed. A direction 1731 of the magnetic field 1730 within the feeder 1710 may have a phase opposite to a phase of a direction 1733 of the magnetic field 1730 outside the feeder 1710. The magnetic field 1730 formed by the feeder 1710 may cause an induced current to be formed in a source resonator 1720. The direction of the induced current may be opposite to a direction of the input current.

Due to the induced current, a magnetic field 1740 may be formed in the source resonator 1720. Directions of a magnetic field formed due to an induced current in all positions of the source resonator 1720 may be identical. Accordingly, a direction 1741 of the magnetic field 1740 formed by the source resonator 1720 may have the same phase as a direction 1743 of the magnetic field 1740 formed by the source resonator 1720.

Consequently, when the magnetic field 1730 formed by the feeder 1710 and the magnetic field 1740 formed by the source resonator 1720 are combined, strength of the total magnetic field may decrease within the feeder 1710, but may increase outside the feeder 1710. In an example in which a power is supplied to the source resonator 1720 through the feeder 1710 configured as illustrated in FIG. 17, the strength of the total magnetic field may decrease in the center of the source resonator 1720, but may increase outside the source resonator 1720. When a magnetic field is randomly distributed in the source resonator 1720, it may be difficult to perform impedance matching, since an input impedance may frequently vary. Additionally, when the strength of the total magnetic field is increased, an efficiency of wireless power transmission may be increased. Conversely, when the strength of the total magnetic field is decreased, the efficiency for wireless power transmission may be reduced. Accordingly, the power transmission efficiency may be reduced on average.

When a magnetic field in a target resonator is distributed as illustrated in FIG. 17A current flowing in the source resonator 1720 may be induced by the input current flowing in the feeder 1710. The current flowing in the target resonator may be induced by a magnetic coupling between the source resonator 1720 and the target resonator. The current flowing in the target resonator may cause a magnetic field to be formed, so that an induced current may be generated in a feeder located in the target resonator. When a direction of a magnetic field within the feeder formed by the target resonator has a phase opposite to a phase of a direction of a magnetic field formed by the feeder and accordingly, the strength of the total magnetic field may be reduced.

FIG. 17B illustrates a wireless power transmitter in which a source resonator 1750 and a feeder 1760 have a common ground. The source resonator 1750 may include a capacitor 1751. The feeder 1760 may receive an input of a radio frequency (RF) signal via a port 1761.

For example, when the RF signal is received to the feeder 1760, an input current may be generated in the feeder 1760. The input current flowing in the feeder 1760 may cause a magnetic field to be formed, and a current may be induced in the source resonator 1750 by the magnetic field. Additionally, another magnetic field may be formed due to the induced current flowing in the source resonator 1750. The direction of the input current flowing in the feeder 1760 may have a phase opposite to a phase of a direction of the induced current flowing in the source resonator 1750. Accordingly, in a region between the source resonator 1750 and the feeder 1760, a direction 1771 of the magnetic field formed due to the input current may have the same phase as a direction 1773 of the magnetic field formed due to the induced current, and thus the strength of the total magnetic field may increase. Conversely, within the feeder 1760, a direction 1781 of the magnetic field formed due to the input current may have a phase opposite to a phase of a direction 1783 of the magnetic field formed due to the induced current, and thus the strength of the total magnetic field may decrease. Therefore, the strength of the total magnetic field may decrease in the center of the source resonator 1750, but may increase outside the source resonator 1750.

The feeder 1760 may determine an input impedance by adjusting an internal area of the feeder 1760. The input impedance refers to an impedance viewed in a direction from the feeder 1760 to the source resonator 1750. When the internal area of the feeder 1760 is increased, the input impedance may be increased. Conversely, when the internal area of the feeder 1760 is reduced, the input impedance may be reduced. Since the magnetic field is randomly distributed in the source resonator 1750 despite a reduction in the input impedance, a value of the input impedance may vary depending on a location of a target device. Accordingly, a separate matching network may be required to match the input impedance to an output impedance of a power amplifier. For example, when the input impedance is increased, a separate matching network may be used to match the increased input impedance to a relatively low output impedance.

When a target resonator has the same configuration as the source resonator 1750, and when a feeder of the target resonator has the same configuration as the feeder 1760, a separate matching network may be required, because a direction of a current flowing in the target resonator has a phase opposite to a phase of a direction of an induced current flowing in the feeder of the target resonator.

Figure 18A:
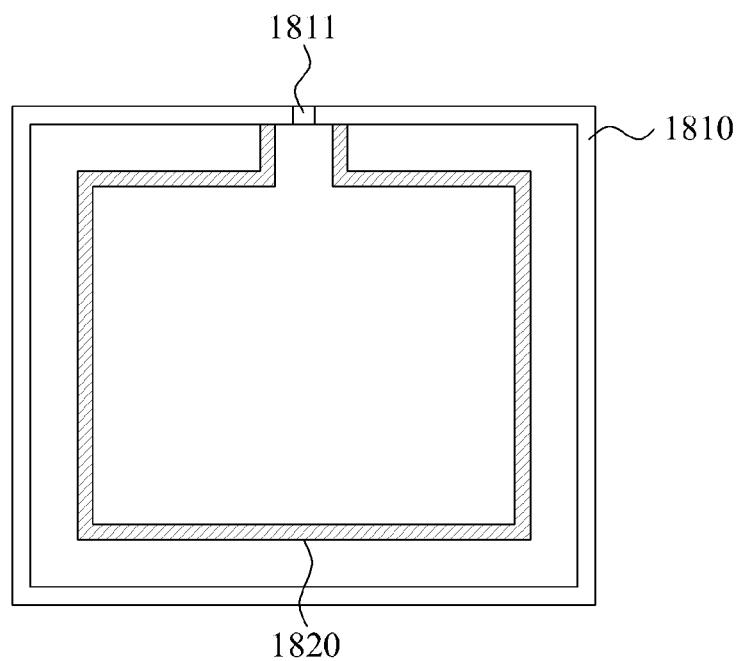
FIGS. 18A and 18B are diagrams illustrating a wireless power transmitter.

FIG. 18A illustrates a wireless power transmitter.

Referring to FIG. 18A, the wireless power transmitter may include a source resonator 1810, and a feeding unit 1820. The source resonator 1810 may include a capacitor 1811. The feeding unit 1820 may be electrically connected to both ends of the capacitor 1811.

Figure 18B:
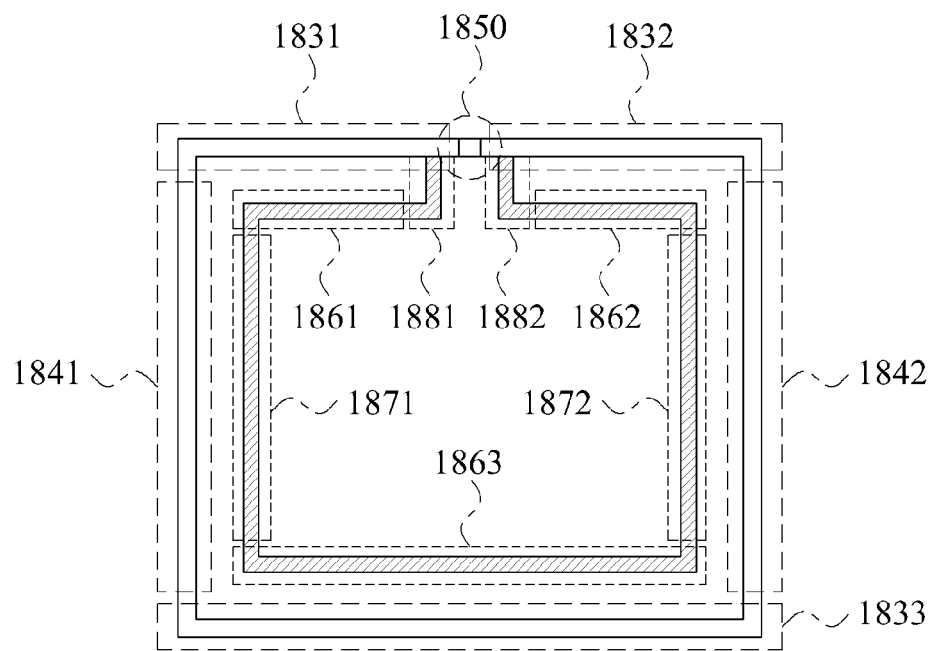

FIG. 18B illustrates, in detail, a structure of the wireless power transmitter of FIG. 18A. The source resonator 1810 may include a first transmission line, a first conductor 1841, a second conductor 1842, and at least one first capacitor 1850.

The first capacitor 1850 may be inserted in series between a first signal conducting portion 1831 and a second signal conducting portion 1832 in the first transmission line, and an electric field may be confined within the first capacitor 1850. For example, the first transmission line may include at least one conductor in an upper portion of the first transmission line, and may also include at least one conductor in a lower portion of the first transmission line. Current may flow through the at least one conductor disposed in the upper portion of the first transmission line, and the at least one conductor disposed in the lower portion of the first transmission line may be electrically grounded. For example, a conductor disposed in an upper portion of the first transmission line may be separated into and thereby be referred to as the first signal conducting portion 1831 and the second signal conducting portion 1832. A conductor disposed in a lower portion of the first transmission line may be referred to as a first ground conducting portion 1833.

As illustrate in FIG. 18B, the source resonator 1810 may have a two-dimensional (2D) structure. The first transmission line may include the first signal conducting portion 1831 and the second signal conducting portion 1832 in the upper portion of the first transmission line. In addition, the first transmission line may include the first ground conducting portion 1833 in the lower portion of the first transmission line. The first signal conducting portion 1831 and the second signal conducting portion 1832 may be disposed to face the first ground conducting portion 1833. The current may flow through the first signal conducting portion 1831 and the second signal conducting portion 1832.

Additionally, one end of the first signal conducting portion 1831 may be electrically connected (i.e., shorted) to the first conductor 1841, and another end of the first signal conducting portion 1831 may be connected to the first capacitor 1850. One end of the second signal conducting portion 1832 may be shorted to the second conductor 1842, and another end of the second signal conducting portion 1832 may be connected to the first capacitor 1850. Accordingly, the first signal conducting portion 1831, the second signal conducting portion 1832, the first ground conducting portion 1833, and the conductors 1841 and 1842 may be connected to each other, so that the source resonator 1810 may have an electrically closed-loop structure. The term "loop structure" as used herein may include, for example, a polygonal structure such as a circular structure, a rectangular structure, or the like that forms a circuit which is electrically closed. The first capacitor 1850 may be inserted into an intermediate portion of the first transmission line. For example, the first capacitor 1850 may be inserted or otherwise positioned into a space between the first signal conducting portion 1831 and the second signal conducting portion 1832. The first capacitor 1850 may be configured as a lumped element, a distributed element, or the like. For example, a distributed capacitor configured as a distributed element may include zigzagged conductor lines and a dielectric material that has a high permittivity between the zigzagged conductor lines.

When the first capacitor 1850 is instead into the first transmission line, the source resonator 1810 may have a characteristic of a metamaterial. The metamaterial indicates a material having a predetermined electrical property that has not been discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 1850 inserted as the lumped element is appropriately determined, the source resonator 1810 may have the characteristic of the metamaterial. Because the source resonator 1810 may have a negative magnetic permeability by appropriately adjusting the capacitance of the first capacitor 1850, the source resonator 1810 may also be referred to as an MNG resonator. Various criteria may be applied to determine the capacitance of the first capacitor 1850. For example, the various criteria may include a criterion for enabling the source resonator 1810 to have the characteristic of the metamaterial, a criterion for enabling the source resonator 1810 to have a negative magnetic permeability in a target frequency, a criterion for enabling the source resonator 1810 to have a zeroth order resonance characteristic in the target frequency, and the like. Based on at least one criterion among the aforementioned criteria, the capacitance of the first capacitor 1850 may be determined.

The source resonator 1810, also referred to as the MNG resonator 1810, may have a zeroth order resonance characteristic of having, as a resonance frequency, a frequency when a propagation constant is "0". Because the source resonator

1810 may have the zeroth order resonance characteristic, the resonance frequency may be independent with respect to a physical size of the MNG resonator 1810. By appropriately designing the first capacitor 1850, the MNG resonator 1810 may sufficiently change the resonance frequency. Accordingly, the physical size of the MNG resonator 1810 may not be changed.

In a near field, the electric field may be concentrated on the first capacitor 1850 inserted into the first transmission line. Accordingly, due to the first capacitor 1850, the magnetic field may become dominant in the near field. The MNG resonator 1810 may have a relatively high Q-argument using the first capacitor 1850 of the lumped element, and thus, it is possible to enhance an efficiency of power transmission. For example, the Q-argument may indicate a level of an ohmic loss or a ratio of a reactance with respect to a resistance in the wireless power transmission. The efficiency of the wireless power transmission may increase according to an increase in the Q-argument.

In some embodiments, a magnetic core may be further provided to pass through the MNG resonator 1810. The magnetic core may increase the power transmission distance.

As illustrated in FIG. 18B, the feeding unit 1820 may include a second transmission line, a third conductor 1871, a fourth conductor 1872, a fifth conductor 1881, and a sixth conductor 1882.

The second transmission line may include a third signal conducting portion 1861 and a fourth signal conducting portion 1862 in an upper portion of the second transmission line. In addition, the second transmission line may include a second ground conducting portion 1863 in a lower portion of the second transmission line. The third signal conducting portion 1861 and the fourth signal conducting portion 1862 may be disposed to face the second ground conducting portion 1863. Current may flow through the third signal conducting portion 1861 and the fourth signal conducting portion 1862.

Additionally, one end of the third signal conducting portion 1861 may be shorted to the third conductor 1871, and another end of the third signal conducting portion 1861 may be connected to the fifth conductor 1881. One end of the fourth signal conducting portion 1862 may be shorted to the fourth conductor 1872, and another end of the fourth signal conducting portion 1862 may be connected to the sixth conductor 1882. The fifth conductor 1881 may be connected to the first signal conducting portion 1831, and the sixth conductor 1882 may be connected to the second signal conducting portion 1832. The fifth conductor 1881 and the sixth conductor 1882 may be connected in parallel to both ends of the first capacitor 1850. In addition, the fifth conductor 1881 and the sixth conductor 1882 may be used as input ports to receive an input of an RF signal.

Accordingly, the third signal conducting portion 1861, the fourth signal conducting portion 1862, the second ground conducting portion 1863, the third conductor 1871; the fourth conductor 1872, the fifth conductor 1881, the sixth conductor 1882, and the source resonator 1810 may be connected to each other, so that the source resonator 1810 and the feeding unit 1820 may have an electrically closed-loop structure. When an RF signal is received via the fifth conductor 1881 or the sixth conductor 1882, an input current may flow in the feeding unit 1820 and the source resonator 1810, a magnetic field may be formed due to the input current, and a current may be induced to the source resonator 1810 by the formed magnetic field. A direction of the input current flowing in the feeding unit 1820 may be identical to a direction of the induced current flowing in the source resonator 1810 and thus, strength of the total magnetic field may increase in the center of the source resonator 1810, but may decrease outside the source resonator 1810. The direction of the input current, and the direction of the induced current will be further described with reference to FIGS. 19A and 19B.

An input impedance may be determined based on an area of a region between the source resonator 1810 and the feeding unit 1820 and accordingly, a separate matching network used to match the input impedance to an output impedance of a power amplifier may not be required. For example, even when the matching network is used, the input impedance may be determined by adjusting a size of the feeding unit 1820 and thus, a structure of the matching network may be simplified. The simplified structure of the matching network may minimize a matching loss of the matching network.

The second transmission line, the third conductor 1871, the fourth conductor 1872, the fifth conductor 1881, and the sixth conductor 1882 may form the same structure as the source resonator 1810. When the source resonator 1810 has a loop structure, the feeding unit 1820 may also have a loop structure. For example, when the source resonator 1810 has a circular structure, the feeding unit 1820 may also have a circular structure.

The above-described configuration of the source resonator 1810 and configuration of the feeding unit 1820 may equally be applied to the target resonator and the feeding unit of the target resonator, respectively. When the feeding unit of the target resonator is configured as described above, the feeding unit may match an output impedance of the target resonator and an input impedance of the feeding unit, by adjusting a size of the feeding unit. Accordingly, a separate matching network may not be used in some instances.

Figure 19B:
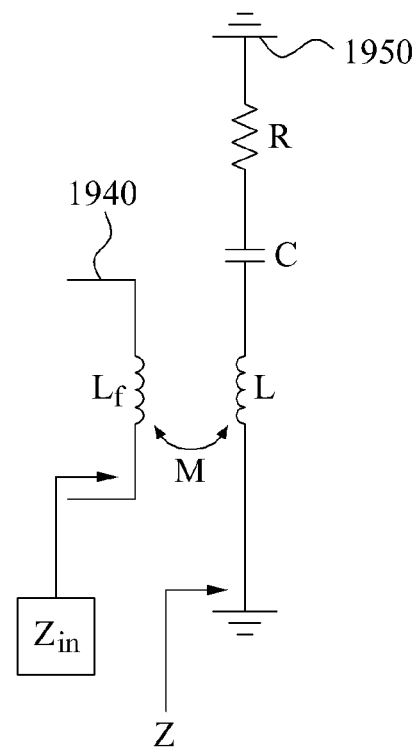
FIG. 19B is a diagram illustrating equivalent circuits of a feeding unit and a source resonator.

FIG. 19A illustrates a distribution of a magnetic field within a source resonator based on feeding of a feeding unit. FIG. 19A more briefly illustrates the source resonator 1810 and the feeding unit 1820 of FIG. 18A. FIG. 19B illustrates an equivalent circuit of a feeding unit 1940, and an equivalent circuit of a source resonator 1950.

A feeding operation may refer to supplying a power to a source resonator in a wireless power transmitter, or refer to supplying an AC power to a rectification unit in a wireless power receiver. FIG. 19A illustrates a direction of an input current flowing in the feeding unit, and a direction of an induced current induced in the source resonator. Additionally, FIG. 19A illustrates a direction of a magnetic field formed due to the input current of the feeding unit, and a direction of a magnetic field formed due to the induced current of the source resonator.

Referring to FIG. 19A, a fifth conductor or a sixth conductor of the feeding unit may be used as an input port 1910. The input port 1910 may receive an input of an RF signal. The RF signal may be output from a power amplifier. The power amplifier may increase or decrease the amplitude of the RF signal, on demand by a target device. The RF signal received by the input port 1910 may be displayed in the form of an input current flowing in the feeding unit. The input current may flow in a clockwise direction in the feeding unit, along a transmission line of the feeding unit. The fifth conductor of the feeding unit may be electrically connected to the source resonator. In addition, the fifth conductor may be connected to a first signal conducting portion of the source resonator. Accordingly, the input current may flow in the source resonator, as well as, in the feeding unit. The input current may flow in a counterclockwise direction in the source resonator. The input current flowing in the source resonator may cause a magnetic field to be formed, so that an induced current may be generated in the source resonator due to the magnetic field. The induced current may flow in a clockwise direction in the source resonator. The induced current may transfer energy to a capacitor of the source resonator, and a magnetic field may be formed due to the induced current. The input current flowing in the feeding unit and the source resonator may be indicated by a solid line of FIG. 19A, and the induced current flowing in the source resonator may be indicated by a dotted line of FIG. 19A.

A direction of a magnetic field formed due to a current may be determined based on the right hand rule. As illustrated in FIG. 19A, within the feeding unit, a direction 1921 of a magnetic field formed due to the input current flowing in the feeding unit may be identical to a direction 1923 of a magnetic field formed due to the induced current flowing in the source resonator. Accordingly, strength of the total magnetic field may increase within the feeding unit.

Additionally, in a region between the feeding unit and the source resonator, a direction 1933 of a magnetic field formed dye to the input current flowing in the feeding unit has a phase opposite to a phase of a direction 1931 of a magnetic field formed due to the induced current flowing in the source resonator, as illustrated in FIG. 19A. Accordingly, strength of the total magnetic field may decrease in the region between the feeding unit and the source resonator.

Typically, the strength of a magnetic field decreases in the center of a source resonator with the loop structure, and increases outside the source resonator. However, referring to FIG. 19A, the feeding unit may be electrically connected to both ends of a capacitor of the source resonator, and accordingly the induced current of the source resonator may flow in the same direction as the input current of the feeding unit. Since the induced current of the source resonator flows in the same direction as the input current of the feeding unit, the strength of the total magnetic field may increase within the feeding unit, and may decrease outside the feeding unit. As a result, the strength of the total magnetic field may increase in the center of the source resonator with the loop structure, and may decrease outside the source resonator, due to the feeding unit. Thus, the strength of the total magnetic field may be equalized within the source resonator. Additionally, the power transmission efficiency for transferring a power from the source resonator to a target resonator may be in proportion to the strength of the total magnetic field formed in the source resonator. When the strength of the total magnetic field increases in the center of the source resonator, the power transmission efficiency may also increase.

Referring to FIG. 19B, the feeding unit 1940 and the source resonator 1950 may be expressed by the equivalent circuits. An input impedance $Z_{in}$ viewed in a direction from the feeding unit 1940 to the source resonator 1950 may be computed, as given in Equation 1.

$$Z_{in} = \frac{(\omega M)^2}{Z} \quad \text{[Equation 1]}$$

In Equation 1, M denotes a mutual inductance between the feeding unit 1940 and the source resonator 1950, $\omega$ denotes a resonance frequency between the feeding unit 1940 and the source resonator 1950, and Z denotes an impedance viewed in a direction from the source resonator 1950 to a target device. The input impedance $Z_{in}$ may be in proportion to the mutual inductance M. Accordingly, the input impedance $Z_{in}$ may be controlled by adjusting the mutual inductance M. The mutual inductance M may be adjusted based on an area of a region between the feeding unit 1940 and the source resonator 1950. The area of the region between the feeding unit 1940 and the source resonator 1950 may be adjusted based on a size of the feeding unit 1940. The input impedance $Z_{in}$ may be determined based on the size of the feeding unit 1940, and thus a separate matching network may not be required to perform impedance matching with an output impedance of a power amplifier.

In a target resonator and a feeding unit included in a wireless power receiver, a magnetic field may be distributed as illustrated in FIG. 19A. For example, the target resonator may receive a wireless power from a source resonator, via magnetic coupling. Due to the received wireless power, an induced current may be generated in the target resonator. A magnetic field formed due to the induced current in the target resonator may cause another induced current to be generated in the feeding unit. When the target resonator is connected to the feeding unit as illustrated in FIG. 19A, the induced current generated in the target resonator may flow in the same direction as the induced current generated in the feeding unit. Thus, strength of the total magnetic field may increase within the feeding unit, but may decrease in a region between the feeding unit and the target resonator.

Figure 20:
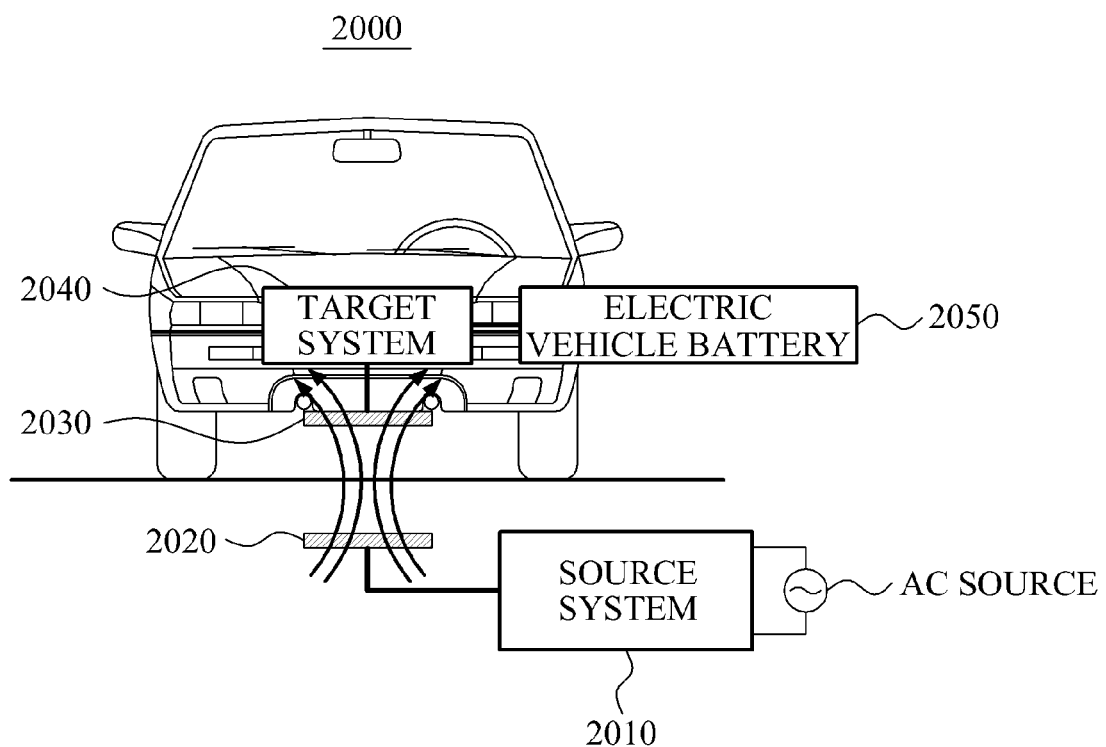
FIG. 20 is a diagram illustrating an example of an electric vehicle charging system.

FIG. 20 illustrates an example of an electric vehicle charging system.

Referring to FIG. 20, an electric vehicle charging system 2000 includes a source system 2010, a source resonator 2020, a target resonator 2030, a target system 2040, and an electric vehicle battery 2050.

The electric vehicle charging system 2000 may have a similar structure to the wireless power transmission and charging system of FIG. 1. The source system 2010 and the source resonator 2020 in the electric vehicle charging system 2000 may function as a source. Additionally, the target resonator 2030 and the target system 2040 in the electric vehicle charging system 2000 may function as a target.

The source system 2010 may include an AC/DC converter, a power detector, a power converter, a control/communication unit, similarly to the source device 110 of FIG. 1. The target system 2040 may include a rectification unit, a DC/DC converter, a switch unit, a charging unit, and a control/communication unit, similarly to the target device 120 of FIG. 1.

The electric vehicle battery 2050 may be charged by the target system 2040.

The electric vehicle charging system 2000 may use a resonant frequency in a band of a few kilohertz (KHz) to tens of MHz.

The source system 2010 may generate power, based on a type of charging vehicle, a capacity of a battery, and a charging state of a battery, and may supply the generated power to the target system 2040.

The source system 2010 may control the source resonator 2020 and the target resonator 2030 to be aligned. For example, when the source resonator 2020 and the target resonator 2030 are not aligned, the control/communication unit of the source system 2010 may transmit a message to the target system 2040, and may control alignment between the source resonator 2020 and the target resonator 2030.

For example, when the target resonator 2030 is not located in a position enabling maximum magnetic resonance, the source resonator 2020 and the target resonator 2030 may not be aligned. When a vehicle does not stop accurately, the source system 2010 may induce a position of the vehicle to be adjusted, and may control the source resonator 2020 and the target resonator 2030 to be aligned.

The source system 2010 and the target system 2040 may transmit or receive an ID of a vehicle, or may exchange various messages, through communication.

The descriptions of FIGS. 2 through 19 may be applied to the electric vehicle charging system 2000. However, the electric vehicle charging system 2000 may use a resonant frequency in a band of a few KHz to tens of MHz, and may transmit power that is equal to or higher than tens of watts to charge the electric vehicle battery 2050.

FIGS. 21A through 22B illustrate examples of applications in which a wireless power receiver and a wireless power transmitter may be mounted.

Figure 21A:
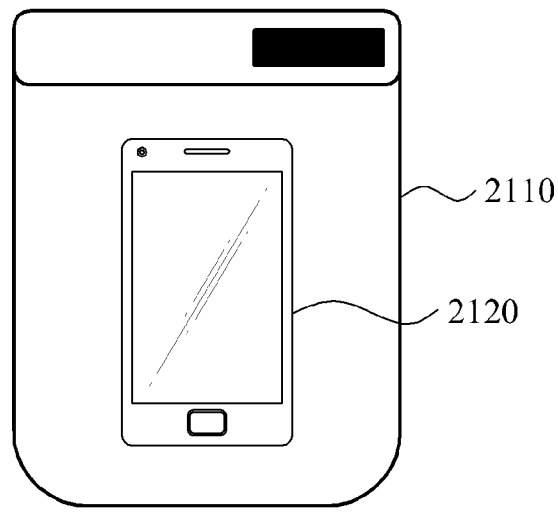
FIGS. 21A through 22B are diagrams illustrating examples of applications in which a wireless power receiver and a wireless power transmitter may be mounted.
Figure 21B:
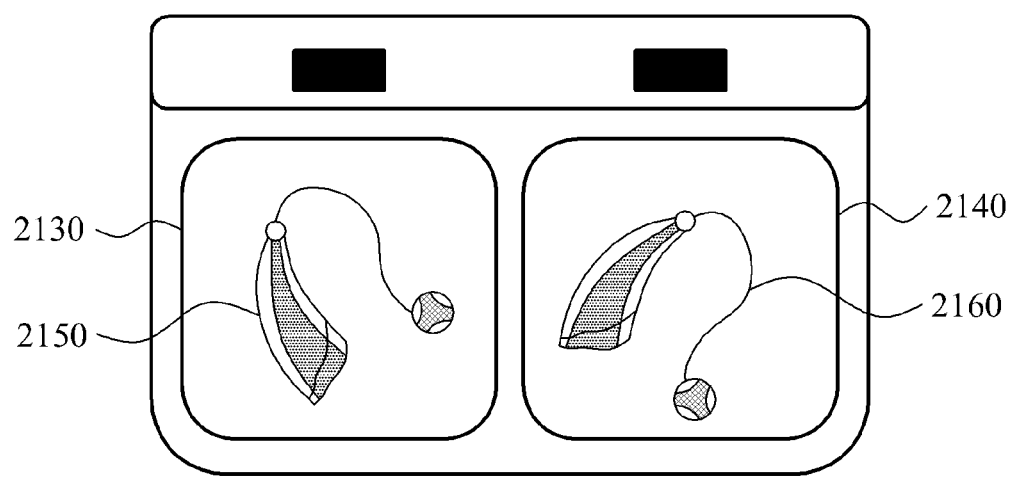

FIG. 21A illustrates an example of wireless power charging between a pad 2110 and a mobile terminal 2120, and FIG. 21B illustrates an example of wireless power charging between pads 2130 and 2140 and hearing aids 2150 and 2160.

In an example, a wireless power transmitter may be mounted in the pad 2110, and a wireless power receiver may be mounted in the mobile terminal 2120. The pad 2110 may be used to charge a single mobile terminal, namely the mobile terminal 2120.

In another example, two wireless power transmitters may be respectively mounted in the pads 2130 and 2140. The hearing aids 2150 and 2160 may be used for a left ear and a right ear, respectively. In this example, two wireless power receivers may be respectively mounted in the hearing aids 2150 and 2160.

Figure 22A:
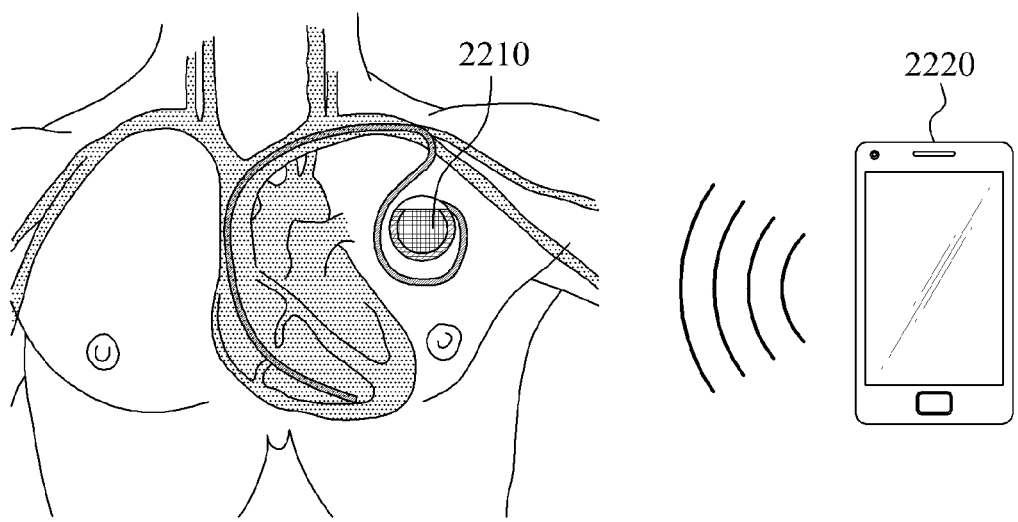
Figure 22B:
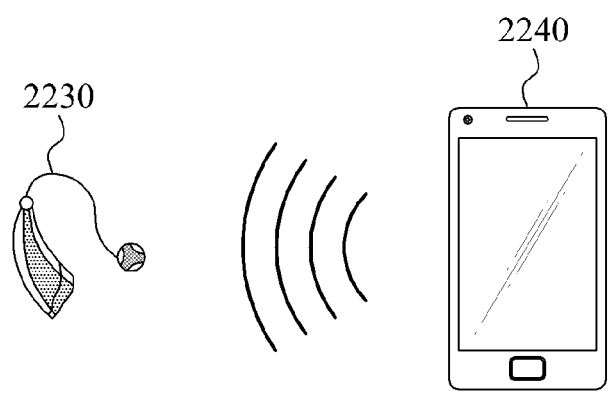

FIG. 22A illustrates an example of wireless power charging between an electronic device 2210 that is inserted into a human body, and a mobile terminal 2220. FIG. 22B illustrates an example of wireless power charging between a hearing aid 2230 and a mobile terminal 2240.

In an example, a wireless power transmitter and a wireless power receiver may be mounted in the mobile terminal 2220. In this example, another wireless power receiver may be mounted in the electronic device 2210. The electronic device 2210 may be charged by receiving power from the mobile terminal 2220.

In another example, a wireless power transmitter and a wireless power receiver may be mounted in the mobile terminal 2240. In this example, another wireless power receiver may be mounted in the hearing aid 2230. The hearing aid 2230 may be charged by receiving power from the mobile terminal 2240. Low-power electronic devices, for example Bluetooth earphones, may also be charged by receiving power from the mobile terminal 2240.

Figure 23:
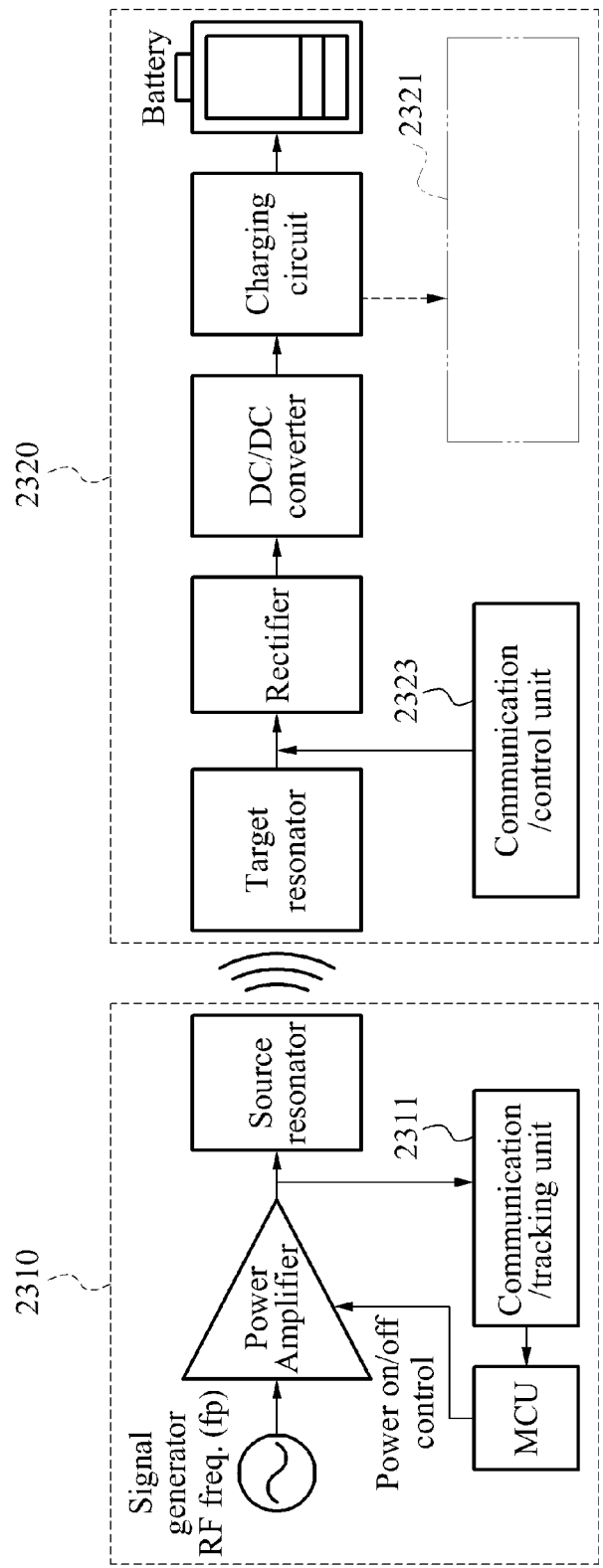
FIG. 23 is a diagram illustrating an example of a wireless power transmitter and a wireless power receiver.

FIG. 23 illustrates an example of a wireless power transmitter and a wireless power receiver.

In FIG. 23, a wireless power transmitter 2310 may be mounted in each of the pads 2130 and 2140 of FIG. 21B. Additionally, the wireless power transmitter 2310 may be mounted in the mobile terminal 2240 of FIG. 22B.

In addition, a wireless power receiver 2320 may be mounted in each of the hearing aids 2150 and 2160 of FIG. 21B.

The wireless power transmitter 2310 may have a similar configuration to the source device 110 of FIG. 1. For example, the wireless power transmitter 2310 may include a unit configured to transmit power using magnetic coupling.

As illustrated in FIG. 23, the wireless power transmitter 2310 includes a communication/tracking unit 2311. The communication/tracking unit 2311 may communicate with the wireless power receiver 2320, and may control an impedance and a resonant frequency to maintain a wireless power transmission efficiency. Additionally, the communication/tracking unit 2311 may perform similar functions to the power converter 114 and the control/communication unit 115 of FIG. 1.

The wireless power receiver 2320 may have a similar configuration to the target device 120 of FIG. 1. For example, the wireless power receiver 2320 may include a unit configured to wirelessly receive power and to charge a battery. As illustrated in FIG. 23, the wireless power receiver 2320 includes a target resonator, a rectifier, a DC/DC converter, and a charging circuit. Additionally, the wireless power receiver 2320 may include a control/communication unit 2323.

The communication/control unit 2323 may communicate with the wireless power transmitter 2310, and may perform an operation to protect overvoltage and overcurrent.

The wireless power receiver 2320 may include a hearing device circuit 2321. The hearing device circuit 2321 may be charged by the battery. The hearing device circuit 2321 may include a microphone, an analog-to-digital converter (ADC), a processor, a digital-to-analog converter (DAC), and a receiver. For example, the hearing device circuit 2321 may have the same configuration as a hearing aid.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power control method of a wireless power transmission, the power control method comprising:
   transmitting, by a source device, access information for identifying a target device, to the target device;
   transmitting, by the source device, a call message to the target device, where the call message being generated based on the access information;
   receiving, at the source device, a response message from the target device, where the response message generated based on the access information and the call message;
   assigning a short ID to the target device, based on the response message in response to the call message, where the short ID being used to identify the target device;
   generating charging power for the target device identified based on the response message, by a power amplifier of the source device; and
   transmitting the charging power to the target device.

2. The power control method of claim 1, further comprising:
   determining an amount of a reference power, based on a battery state of the target device, the reference power being supplied to a power amplifier.

3. The power control method of claim 2, further comprising:
   adjusting a voltage supplied to the power amplifier, so that the reference power is supplied to the power amplifier.

4. The power control method of claim 1, further comprising:
   adjusting a voltage supplied to the power amplifier using a lookup table configured to store an amount of the voltage to be adjusted based on a change in a temperature of the source device.

5. The power control method of claim 1, further comprising:
   detecting a change in a current input to the power amplifier, a change in a temperature of the source device, a change in an amount of a power received to the target device, or a change in a temperature of the target device, and
   wherein the change in the temperature of the target device is detected based on data received from the target device.

6. The power control method of claim 5, wherein the change in the amount of the power received to the target device is detected, based on data received from the target device, a pre-measured power transmission efficiency, and an output power amount of the power amplifier.

7. The power control method of claim 1, further comprising:
   transmitting, by the source device, the call message to the target devices, to detect a temporary ID of the target devices, the temporary ID being created based on the access information.

8. The power control method of claim 7, wherein the access information comprises a reference point field, a call argument field, and a movement argument field, and wherein the reference point field indicates a reference point that is used to create a temporary ID of a selected target device among the target devices from a unique ID of the selected target device, and the call argument field indicates n consecutive bits starting from the reference point, and the movement argument field indicates a number of bits corresponding to a movement of the reference point.

9. The power control method of claim 7, wherein the transmitting of the call message comprises transmitting the call message at predetermined intervals, the call message being generated based on a value set in the call argument field.

10. The power control method of claim 7, wherein the assigning of the control ID comprises assigning a control ID to a selected target device among the target device having a temporary ID identical to the call message, when the selected target device transmits an acknowledge (ACK) signal in response to the call message.

11. The power control method of claim 1, further comprising:
    receiving, from the target device, power information of a rectifier output of the target device; and
    adjusting a voltage supplied to the power amplifier, based on the power information.

12. A wireless power transmitter of a wireless power transmission, the wireless power transmitter comprising:
    a power converter configured to generate power;
    a source resonator configured to
    transmit access information for identifying a target device to the target device,
    transmit a call message to the target device, where the call message being generated based on the access information,
    receive, at the source device, a response message from the target device, where the response message generated based on the access information and the call message, and transmit power to the target device identified based on the response message; and
    a controller configured to assign a short ID to the target device, based on the response message in response to the call message, where the short ID being used to identify the target device.

13. The wireless power transmitter 12, wherein the power converter is configured to generate power by converting a direct current (DC) voltage to an alternating current (AC) voltage using a resonance frequency.

14. The wireless power transmitter 12, wherein the controller is further configured to:
    determine an amount of a reference power based on a battery state of the target device, the reference power being supplied to the power amplifier.

15. The wireless power transmitter 12, wherein the co source resonator is further configured to:
    receive, from the target device, power information of a rectifier output of the target device, and
    adjust a voltage supplied to a power amplifier based on the power information.

16. A power receiving method of a wireless power transmission, the power receiving method comprising:
    receiving, at a target device, an access information for identifying the target device, from a source device;
    receiving, at the target device, a call message from the source device where the call message being generated based on the access information;
    transmitting, from the target device to the source device, a response message where the response message generated based on the access information and the call message; and
    receiving, at the target device, a charging power for the charging operation from a source device based on the response message;
    wherein a short ID is assigned to the target device, based on the response message in response to the call message, where the short ID being used to identify the target device.

17. The power receiving method of claim 16, further comprising:
- receiving, at the target device, a wake-up power and a wake-up request message from the source device; and
- transmitting, from the target device to the source device, an acknowledge (ACK) message in response to the wake-up request message.

18. The power receiving method of claim 16, comprising:
- creating the temporary ID based on a value set in a reference point field, a value set in a call argument field, and a value set in a movement argument field, the reference point field, the call argument field, and the movement argument field being included in the first message, wherein the call message is generated based on the value set in the call argument field; and
- comparing the temporary ID with the call message, wherein the response message is transmitted from the target device to the source device when the temporary ID is identical to the call message.

19. The power receiving method of claim 18, wherein:
- when the source device determines, based on a response messages, that the target device have a identical temporary ID, the access information is updated by changing the value set in the movement argument field; and
- the temporary ID of the target devices is updated based on the updated access information.

20. The power receiving method of claim 16, further comprising:
- transmitting, from the target device to the source device, information on an amount of a received power, the information comprising at least one of rectifier voltage output data and rectifier current output data; and
- receiving, at the target device, the charging power from the source device, after the source device adjusts a voltage supplied to a power amplifier of the source device based on the information on the amount of the received power.

\* \* \* \* \*